United States Patent
Heddes et al.

(10) Patent No.: US 10,503,661 B2
(45) Date of Patent: Dec. 10, 2019

(54) PROVIDING MEMORY BANDWIDTH COMPRESSION USING COMPRESSED MEMORY CONTROLLERS (CMCS) IN A CENTRAL PROCESSING UNIT (CPU)-BASED SYSTEM

(71) Applicant: QUALCOMM Incorporated, San Diego, CA (US)

(72) Inventors: Mattheus Cornelis Antonius Adrianus Heddes, Raleigh, NC (US); Natarajan Vaidhyanathan, Carrboro, NC (US); Colin Beaton Verrilli, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 14/717,552

(22) Filed: May 20, 2015

(65) Prior Publication Data

US 2015/0339239 A1 Nov. 26, 2015

Related U.S. Application Data

(63) Continuation-in-part of application No. 14/716,001, filed on May 19, 2015.

(Continued)

(51) Int. Cl.
*G06F 12/0811* (2016.01)
*G06F 12/1081* (2016.01)
(Continued)

(52) U.S. Cl.
CPC ........ *G06F 12/1081* (2013.01); *G06F 12/023* (2013.01); *G06F 12/0811* (2013.01);
(Continued)

(58) Field of Classification Search
None
See application file for complete search history.

(56) References Cited

U.S. PATENT DOCUMENTS

| 5,696,927 | A   | 12/1997 | MacDonald et al. |
| 6,212,603 | B1* | 4/2001  | McInerney ........... G06F 9/3802 711/125 |

(Continued)

FOREIGN PATENT DOCUMENTS

| CN | 103197897 A | 7/2013 |
| JP | H09259040 A | 10/1997 |

(Continued)

OTHER PUBLICATIONS

International Search Report and Written Opinion for PCT/US2015/031717, dated Aug. 12, 2015, 11 pages.

(Continued)

*Primary Examiner* — Sean D Rossiter
*Assistant Examiner* — Stephanie Wu
(74) *Attorney, Agent, or Firm* — Withrow & Terranova, PLLC

(57) ABSTRACT

Providing memory bandwidth compression using compressed memory controllers (CMCs) in a central processing unit (CPU)-based system is disclosed. In this regard, in some aspects, a CMC is configured to receive a memory read request to a physical address in a system memory, and read a compression indicator (CI) for the physical address from a master directory and/or from error correcting code (ECC) bits of the physical address. Based on the CI, the CMC determines a number of memory blocks to be read for the memory read request, and reads the determined number of memory blocks. In some aspects, a CMC is configured to receive a memory write request to a physical address in the system memory, and generate a CI for write data based on a compression pattern of the write data. The CMC updates (Continued)

the master directory and/or the ECC bits of the physical address with the generated CI.

16 Claims, 25 Drawing Sheets

Related U.S. Application Data

(60) Provisional application No. 62/001,545, filed on May 21, 2014, provisional application No. 62/092,326, filed on Dec. 16, 2014, provisional application No. 62/092,409, filed on Dec. 16, 2014.

(51) Int. Cl.
  *G06F 12/0817* (2016.01)
  *G06F 12/0831* (2016.01)
  *G06F 12/02* (2006.01)

(52) U.S. Cl.
  CPC ...... *G06F 12/0817* (2013.01); *G06F 12/0833* (2013.01); *G06F 2212/1024* (2013.01); *G06F 2212/1044* (2013.01); *G06F 2212/2532* (2013.01); *G06F 2212/401* (2013.01); *G06F 2212/452* (2013.01); *G06F 2212/62* (2013.01); *G06F 2212/621* (2013.01); *G06F 2212/622* (2013.01); *Y02D 10/13* (2018.01)

(56) References Cited

U.S. PATENT DOCUMENTS

| | | | |
|---|---|---|---|
| 6,353,871 B1 | 3/2002 | Benveniste et al. | |
| 6,523,102 B1 | 2/2003 | Dye et al. | |
| 6,640,283 B2 | 10/2003 | Naffziger et al. | |
| 6,735,673 B2 | 5/2004 | Kever | |
| 6,795,897 B2 | 9/2004 | Benveniste et al. | |
| 6,981,119 B1 | 12/2005 | Lepak et al. | |
| 7,512,750 B2 | 3/2009 | Newburn et al. | |
| 7,636,813 B2 | 12/2009 | Tremaine | |
| RE43,483 E | 6/2012 | Geiger et al. | |
| 8,341,380 B2 | 12/2012 | Deming et al. | |
| 8,539,163 B1 | 9/2013 | Sivasubramanian et al. | |
| 8,595,437 B1 | 11/2013 | Glasco et al. | |
| 8,751,830 B2 | 6/2014 | Muff et al. | |
| 9,569,357 B1* | 2/2017 | Shalev | G06F 11/1453 |
| 9,678,969 B2* | 6/2017 | Deng | G06F 17/3012 |
| 9,727,247 B2* | 8/2017 | Ogawa | G06F 3/0608 |
| 2002/0040413 A1 | 4/2002 | Okada et al. | |
| 2003/0188110 A1 | 10/2003 | Abali et al. | |
| 2005/0268046 A1 | 12/2005 | Heil | |
| 2005/0268177 A1* | 12/2005 | John | G06F 11/3471 |
| | | | 714/47.1 |
| 2008/0059728 A1 | 3/2008 | Daly et al. | |
| 2008/0301256 A1 | 12/2008 | McWilliams et al. | |
| 2010/0228800 A1* | 9/2010 | Aston | G06F 17/30153 |
| | | | 707/822 |
| 2010/0281340 A1* | 11/2010 | Franceschini | G06F 12/0246 |
| | | | 714/763 |
| 2011/0016198 A1* | 1/2011 | Shishido | G11B 27/105 |
| | | | 709/219 |
| 2011/0055456 A1 | 3/2011 | Yeh | |
| 2011/0087840 A1 | 4/2011 | Glasco et al. | |
| 2011/0276746 A1* | 11/2011 | Pruthi | G06F 12/0866 |
| | | | 711/103 |
| 2012/0079202 A1* | 3/2012 | Chirca | G06F 12/0862 |
| | | | 711/122 |
| 2012/0110269 A1* | 5/2012 | Frank | G06F 9/30047 |
| | | | 711/137 |
| 2012/0317334 A1 | 12/2012 | Suzuki et al. | |
| 2012/0317365 A1 | 12/2012 | Elhamias | |
| 2013/0138867 A1* | 5/2013 | Craft | G06F 12/0246 |
| | | | 711/103 |
| 2013/0179752 A1* | 7/2013 | Shim | G06F 11/10 |
| | | | 714/773 |
| 2013/0346698 A1* | 12/2013 | Waugh | G06F 12/0862 |
| | | | 711/125 |
| 2014/0092678 A1* | 4/2014 | Feekes | G06F 12/06 |
| | | | 365/163 |
| 2015/0339228 A1 | 11/2015 | Heddes et al. | |
| 2015/0339237 A1 | 11/2015 | Heddes et al. | |
| 2015/0347013 A1 | 12/2015 | Mathur et al. | |
| 2016/0011787 A1* | 1/2016 | Ogawa | G06F 3/061 |
| | | | 711/114 |
| 2016/0019154 A1* | 1/2016 | Gooding | G06F 12/0862 |
| | | | 711/137 |
| 2016/0055088 A1 | 2/2016 | Zhang et al. | |
| 2016/0170904 A1 | 6/2016 | Guo et al. | |
| 2016/0179679 A1* | 6/2016 | Morris | G06F 12/0862 |
| | | | 711/137 |
| 2016/0253105 A1 | 9/2016 | Chang et al. | |
| 2016/0253266 A1 | 9/2016 | Park | |
| 2017/0103023 A1 | 4/2017 | Matsuo | |
| 2017/0220488 A1* | 8/2017 | Balasubramanian | |
| | | | G06F 12/128 |
| 2017/0345122 A1* | 11/2017 | Seiler | G06T 1/20 |

FOREIGN PATENT DOCUMENTS

| | | |
|---|---|---|
| JP | 2000227874 A | 8/2000 |
| JP | 2004355124 A | 12/2004 |
| JP | 2008525919 A | 7/2008 |
| JP | 2010134929 A | 6/2010 |
| JP | 2015525423 A | 9/2015 |
| WO | 2006071792 A2 | 7/2006 |
| WO | 2013192548 A1 | 12/2013 |

OTHER PUBLICATIONS

International Search Report and Written Opinion for PCT/US2015/031913, dated Aug. 24, 2015, 9 pages.
International Search Report and Written Opinion for PCT/US2015/031885, dated Aug. 24, 2015, 9 pages.
Second Written Opinion for PCT/US2015/031717, dated May 12, 2016, 5 pages.
International Preliminary Report on Patentability for PCT/US2015/031913, dated May 30, 2016, 22 pages.
International Preliminary Report on Patentability for PCT/US2015/031885, dated May 30, 2016, 22 pages.
Author Unknown, "Understanding Memory Resource Management in VMware ESX 4.1," Vmware, Inc., 2010, retrieved from http://www.vmware.com/files/pdf/techpaper/vsp_41_perf_memory_mgmt.pdf, 25 pages.
Pekhimenko, G. et al., "Linearly Compressed Pages: A Low-Complexity,Low-Latency Main Memory Compression Framework," Proceedings of the 46th Annual IEEE/ACM International Symposium on Microarchitecture (MICRO-46), Dec. 7-11, 2013, Davis, CA, ACM, 13 pages.
International Preliminary Report on Patentability for PCT/US2015/031717, dated Aug. 18, 2016, 23 pages.

* cited by examiner

*FIG. 17*

| PATTERN | LENGTH | DEFINITION (338) |
|---|---|---|
| PATTERN0 | 32 | COVERS BIT 63..32 OF A 64-BIT WORD |
| PATTERN1 | 16 | COVERS BIT 31..16 OF A 64-BIT WORD |
| PATTERN2 | 16 | COVERS BIT 15..0 OF A 64-BIT WORD |

332

| FLAGS | VALUE | DEFINITION (346) |
|---|---|---|
| BIT 0, 1 | 00 | PATTERN0 = 0, NOT CODED IN VARIABLE LENGTH BASE BLOCK |
| | 01 | PATTERN0 = 0x000000yy, PATTERN0 IS CODED AS 8-BIT VALUE IN BASE BLOCK |
| | 10 | PATTERN0 IS CODED AS 32-BIT VALUE IN BASE BLOCK |
| | 11 | PATTERN1 IS CODED AS 16-BIT VALUE IN BASE BLOCK |
| BIT 2 | 1 | PATTERN1 IS CODED AS 16-BIT VALUE IN BASE BLOCK |
| BIT 3 | 1 | PATTERN2 IS CODED AS 16-BIT VALUE IN BASE BLOCK |

340

Source
Data Format
(128 Bytes)
(350)

| Word0 | Word1 | Word2 | Word3 | Word4 | Word5 | ... | Word15 |

348

New
Compressed
Data Format
(352)

| P 0 | Data 0 | P 1 | Data 1 | P 2 | Data 2 | P 3 | Data 3 | P 4 | Data 4 | ... | P 31 | Data 31 | pattern 0 | ... | pattern 5 | Flags |

64 bits / 4 bits

Actual format of compressed output is similar to New4

358

| PREFIX (354) | PATTERN ENCODED (360) | DATA SIZE (BITS) (364) |
|---|---|---|
| 0000 | 0x0000000000000000 | 0 |
| 0001 | 0x000000000000000y | 4 |
| 0010 | 0x00000000000000yy | 8 |
| 0011 | 0x0000000000000yyy | 12 |
| 0100 | 0x000000000000yyyy | 16 |
| 0101 | 0x00000000yy000000 | 16 |
| 0110 | 0x0000000000yyyyyy | 20 |
| 0111 | 0x0000yyyy0000yyyy | 32 |

| PREFIX (356) | PATTERN ENCODED (362) | DATA SIZE (BITS) (366) |
|---|---|---|
| 1000 | 0x000000000000yyyyyy | 24 |
| 1001 | PATTERN0 | 0 |
| 1010 | PATTERN1 | 8 |
| 1011 | PATTERN2 | 16 |
| 1100 | PATTERN3 | 24 |
| 1101 | PATTERN4 | 32 |
| 1110 | PATTERN5 | 40 |
| 1111 | UNCOMPRESSED | 64 |

Pattern0: 64 upper bits
Pattern1: 56 upper
Pattern2: 48 upper
Pattern3: 40 upper
Pattern4: 32 upper
Pattern5: 24 upper

*FIG. 18*

PROVIDING MEMORY BANDWIDTH COMPRESSION USING COMPRESSED MEMORY CONTROLLERS (CMCS) IN A CENTRAL PROCESSING UNIT (CPU)-BASED SYSTEM

PRIORITY APPLICATIONS

The present application claims priority to U.S. Provisional Patent Application Ser. No. 62/001,545 filed on May 21, 2014 and entitled "MEMORY CONTROLLERS EMPLOYING MEMORY CAPACITY AND/OR BANDWIDTH COMPRESSION, AND RELATED PROCESSOR-BASED SYSTEMS AND METHODS," which is incorporated herein by reference in its entirety.

The present application also claims priority to U.S. Provisional Patent Application Ser. No. 62/092,326 filed on Dec. 16, 2014 and entitled "MEMORY CONTROLLERS EMPLOYING MEMORY CAPACITY AND/OR BANDWIDTH COMPRESSION, AND RELATED PROCESSOR-BASED SYSTEMS AND METHODS," which is incorporated herein by reference in its entirety.

The present application also claims priority to U.S. Provisional Patent Application Ser. No. 62/092,409 filed on Dec. 16, 2014 and entitled "MEMORY CONTROLLERS EMPLOYING MEMORY CAPACITY AND/OR BANDWIDTH COMPRESSION WITH NEXT READ ADDRESS PREFETCHING, AND RELATED PROCESSOR-BASED SYSTEMS AND METHODS," which is incorporated herein by reference in its entirety.

The present application is a continuation-in-part of and claims priority to U.S. patent application Ser. No. 14/716,001 filed on May 19, 2015 and entitled "MEMORY CONTROLLERS EMPLOYING MEMORY CAPACITY COMPRESSION, AND RELATED PROCESSOR-BASED SYSTEMS AND METHODS," which is incorporated herein by reference in its entirety.

BACKGROUND

I. Field of the Disclosure

The technology of the disclosure relates generally to computer memory systems, and particularly to memory controllers in computer memory systems for providing central processing units (CPUs) with a memory access interface to memory.

II. Background

Microprocessors perform computational tasks in a wide variety of applications. A typical microprocessor application includes one or more central processing units (CPUs) that execute software instructions. The software instructions may instruct a CPU to fetch data from a location in memory, perform one or more CPU operations using the fetched data, and generate a result. The result may then be stored in memory. As non-limiting examples, this memory can be a cache local to the CPU, a shared local cache among CPUs in a CPU block, a shared cache among multiple CPU blocks, or main memory of the microprocessor.

In this regard, FIG. 1 is a schematic diagram of an exemplary system-on-a-chip (SoC) 10 that includes a CPU-based system 12. The CPU-based system 12 includes a plurality of CPU blocks 14(1)-14(N) in this example, wherein 'N' is equal to any number of CPU blocks 14(1)-14(N) desired. In the example of FIG. 1, each of the CPU blocks 14(1)-14(N) contains two CPUs 16(1), 16(2). The CPU blocks 14(1)-14(N) further contain shared Level 2 (L2) caches 18(1)-18(N), respectively. A shared Level 3 (L3) cache 20 is also provided for storing cached data that is used by any of, or shared among, each of the CPU blocks 14(1)-14(N). An internal system bus 22 is provided to enable each of the CPU blocks 14(1)-14(N) to access the shared L3 cache 20 as well as other shared resources. Other shared resources accessed by the CPU blocks 14(1)-14(N) through the internal system bus 22 may include a memory controller 24 for accessing a main, external memory (e.g., double-rate dynamic random access memory (DRAM) (DDR), as a non-limiting example), peripherals 26, other storage 28, an express peripheral component interconnect (PCI) (PCI-e) interface 30, a direct memory access (DMA) controller 32, and/or an integrated memory controller (IMC) 34.

As CPU-based applications executing in the CPU-based system 12 in FIG. 1 increase in complexity and performance, the memory capacity requirements of the shared L2 cache 18(1)-18(N) and the shared L3 cache 20, and external memory accessible through the memory controller 24 may also increase. Data compression may be employed to increase the effective memory capacity of the CPU-based system 12 without increasing physical memory capacity. However, the use of data compression may increase memory access latency and consume additional memory bandwidth, as multiple memory access requests may be required to retrieve data, depending on whether the data is compressed or uncompressed. Accordingly, it is desirable to increase memory capacity of the CPU-based system 12 using data compression while mitigating the impact on memory access latency and memory bandwidth.

SUMMARY OF THE DISCLOSURE

Aspects disclosed herein include providing memory bandwidth compression using compressed memory controllers (CMCs) in a central processing unit (CPU)-based system. In this regard, in some aspects, a CMC is configured to provide memory bandwidth compression for memory read requests and/or memory write requests. According to some aspects, upon receiving a memory read request to a physical address in a system memory, the CMC may read a compression indicator (CI) for the physical address from a master directory and/or from error correcting code (ECC) bits associated with the physical address in the system memory. The CI in some aspects may provide the CMC with a compression pattern (e.g., indicating whether data is compressed or uncompressed and/or indicating a number of memory blocks in which compressed data is stored at the physical address). Based on the CI, the CMC determines a number of memory blocks to be read for the memory read request, and reads the determined number of memory blocks beginning at the physical address. In some aspects, upon receiving a memory write request to a physical address in the system memory, the CMC may determine a compression pattern for write data to be written, and may generate a CI for the write data based on the compression pattern. The CMC may then update the master directory and/or the ECC bits associated with the physical address, and write the write data to the system memory based on the generated CI. Some aspects of the CMC may further provide a CI cache for caching previously read CIs. In this manner, the CMC may read and write compressed and uncompressed data more efficiently, resulting in decreased memory access latency and improved system performance.

In another aspect, a CMC is provided. The CMC comprises a memory interface configured to access a system memory via a system bus. The CMC is configured to receive a memory read request comprising a physical address of a memory block to be accessed within a memory line in the system memory. The CMC is further configured to read a master directory memory block containing a CI corresponding to the physical address from a master directory in the system memory. The CMC is also configured to determine, based on the CI, a number of memory blocks within the memory line in the system memory to read for the memory read request. The CMC is additionally configured to read the determined number of memory blocks within the memory line in the system memory beginning at the physical address.

In another aspect, a CMC is provided. The CMC comprises a memory interface configured to access a system memory via a system bus. The CMC is configured to receive a memory write request comprising write data and a physical address of a memory block to be written within a memory line in the system memory. The CMC is further configured to determine a compression pattern for the write data. The CMC is also configured to generate a CI for the write data based on the compression pattern. The CMC is additionally configured to update a stored CI corresponding to the physical address in a master directory with the generated CI. The CMC is further configured to write the write data to one or more memory blocks in the memory line in the system memory based on the generated CI. The CMC is also configured to write the generated CI into one or more ECC bits of each of the one or more memory blocks in the memory line of the system memory.

In another aspect, a method for providing memory bandwidth compression for memory read requests is provided. The method comprises receiving, by a CMC via a system bus, a memory read request comprising a physical address of a memory block to be accessed within a memory line in a system memory. The method further comprises reading a master directory memory block containing a CI corresponding to the physical address from a master directory in the system memory. The method also comprises determining, based on the CI, a number of memory blocks within the memory line in the system memory to read for the memory read request. The method additionally comprises reading the determined number of memory blocks within the memory line in the system memory beginning at the physical address.

In another aspect, a method for providing memory bandwidth compression for memory write requests is provided. The method comprises receiving, by a CMC via a system bus, a memory write request comprising write data and a physical address of a memory block to be written within a memory line in a system memory. The method further comprises determining a compression pattern for the write data. The method also comprises generating a CI for the write data based on the compression pattern. The method additionally comprises updating a stored CI corresponding to the physical address in a master directory with the generated CI. The method further comprises writing the write data to one or more memory blocks in the memory line in the system memory based on the generated CI. The method also comprises writing the generated CI into one or more ECC bits of each of the one or more memory blocks in the memory line of the system memory.

In other aspects, compression methods and formats that may be well-suited for small data block compression are disclosed. These compression methods and formats can be employed for memory bandwidth compression aspects disclosed herein.

With some or all aspects of these CMCs and compression mechanisms, it may be possible to decrease memory access latency and effectively increase memory bandwidth of a CPU-based system, while mitigating an increase in physical memory size and minimizing the impact on system performance.

BRIEF DESCRIPTION OF THE FIGURES

FIGS. 12-18 illustrate exemplary data block compression formats and mechanisms, any of which may be used by the CMC of FIG. 3 to compress and decompress memory data blocks.

DETAILED DESCRIPTION

Figure 1:
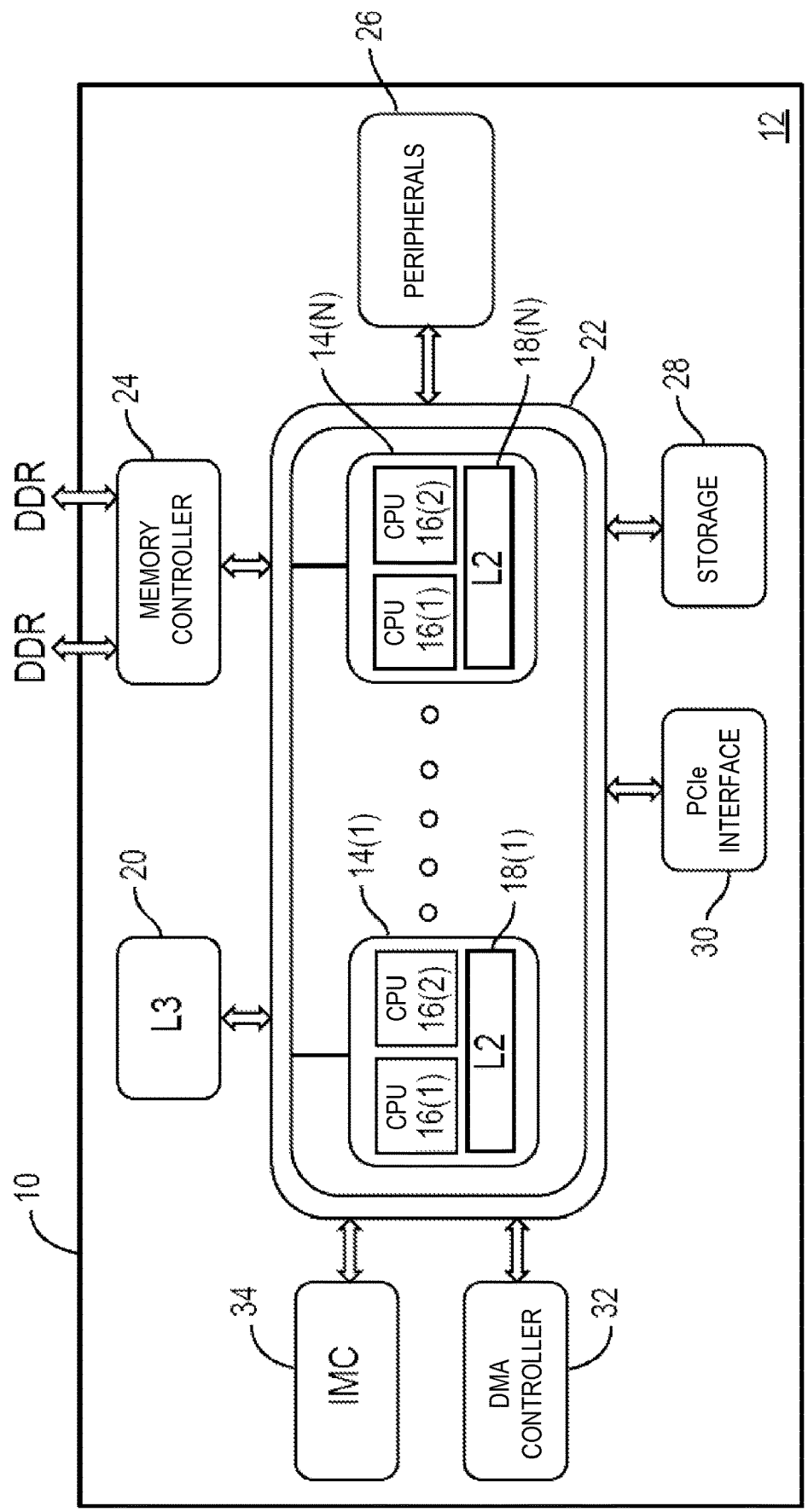
FIG. 1 is a schematic diagram of an exemplary system-on-a-chip (SoC) that includes a central processing unit (CPU)-based system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include providing memory bandwidth compression using compressed memory controllers (CMCs) in a central processing unit (CPU)-based system. In this regard, in some aspects, a CMC is configured to provide memory bandwidth compression for memory read requests and/or memory write requests. According to some aspects, upon receiving a memory read request to a physical address in a system memory, the CMC may read a compression indicator (CI) for the physical address from a master directory and/or from error correcting code (ECC) bits associated with the physical address in the system memory. The CI in some aspects may provide the CMC with a compression pattern (e.g., indicating whether data is compressed or uncompressed and/or indicating a number of memory blocks in which compressed data is stored at the physical address). Based on the CI, the CMC determines a number of memory blocks to be read for the memory read request, and reads the determined number of memory blocks beginning at the physical address. In some aspects, upon receiving a memory write request to a physical address in the system memory, the CMC may determine a compression pattern for write data to be written, and may generate a CI for the write data based on the compression pattern. The CMC may then update the master directory and/or the ECC bits associated with the physical address, and write the write data to the system memory based on the generated CI. Some aspects of the CMC may further provide a CI cache for caching previously read CIs. In this manner, the CMC may read and write compressed and uncompressed data more efficiently, resulting in decreased memory access latency and improved system performance.

Figure 2:
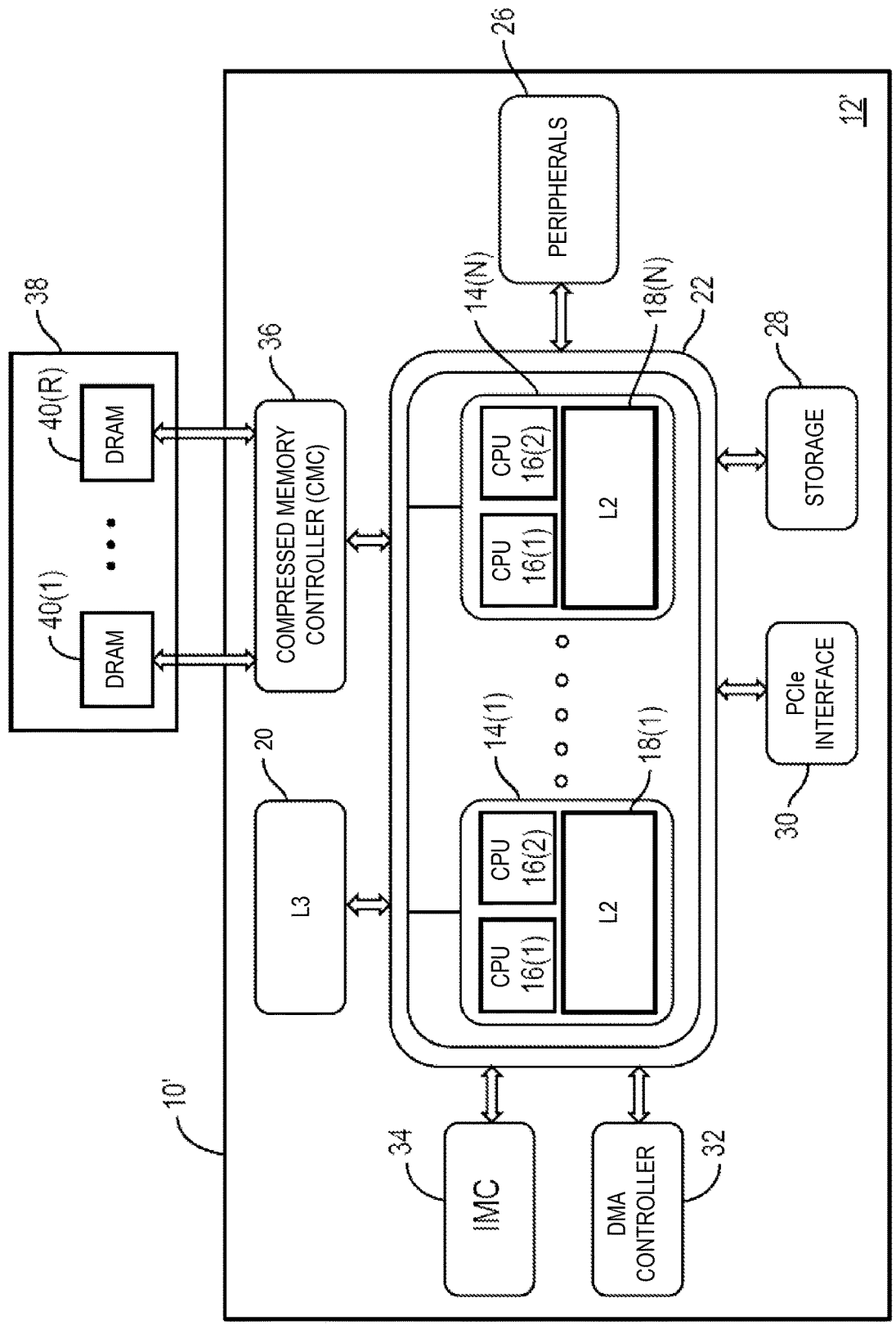
FIG. 2 is a schematic diagram of an SoC that includes an exemplary CPU-based system having a plurality of CPUs and a compressed memory controller (CMC) configured to provide memory bandwidth compression.

In this regard, FIG. 2 is a schematic diagram of an SoC 10' that includes an exemplary CPU-based system 12' having a plurality of CPU blocks 14(1)-14(N) similar to the CPU-based system 12 in FIG. 1. The CPU-based system 12' in FIG. 2 includes some common components with the CPU-based system 12 in FIG. 1, which are noted by common element numbers between FIGS. 1 and 2. For the sake of brevity, these elements will not be re-described. However, in the CPU-based system 12' in FIG. 2, a CMC 36 is provided. The CMC 36 controls access to a system memory 38. The system memory 38 may comprise one or more double data rate (DDR) dynamic random access memories (DRAMs) 40(1)-40(R) (referred to hereinafter as "DRAM 40(1)-40(R)"), as a non-limiting example. The CMC 36 in this example employs memory bandwidth compression according to the aspects disclosed herein and below. Similar to the memory controller 24 of the CPU-based system 12 of FIG. 1, the CMC 36 in the CPU-based system 12' in FIG. 2 is shared by the CPU blocks 14(1)-14(N) through the internal system bus 22.

Figure 3:
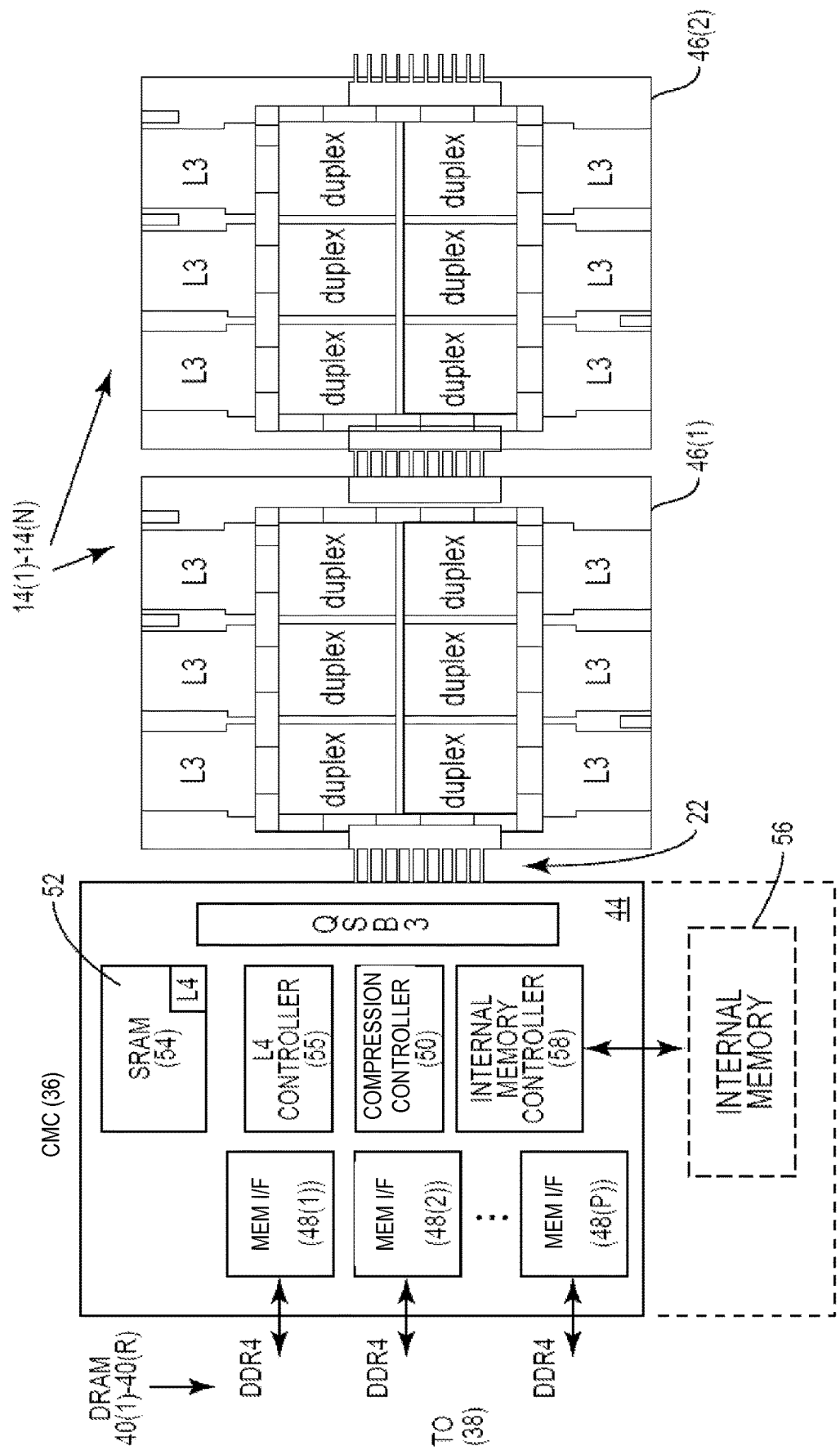
FIG. 3 is a more detailed schematic diagram of the CMC of FIG. 2, wherein the CMC is further communicatively coupled to an optional, internal memory that may be employed to provide memory bandwidth compression.

To illustrate a more detailed schematic diagram of exemplary internal components of the CMC 36 in FIG. 2, FIG. 3 is provided. In this example, the CMC 36 is provided on a separate semiconductor die 44 from semiconductor dies 46(1), 46(2) that contain the CPU blocks 14(1)-14(N) in FIG. 2. Alternatively, in some aspects the CMC 36 may be included in a common semiconductor die (not shown) with the CPU blocks 14(1)-14(N). Regardless of the die configurations, the CMC 36 is provided such that the CPU blocks 14(1)-14(N) may make memory access requests via the internal system bus 22 to the CMC 36, and receive data from memory through the CMC 36.

With continuing reference to FIG. 3, the CMC 36 controls operations for memory accesses to the system memory 38, which is shown in FIGS. 2 and 3 as comprising DRAM 40(1)-40(R). The CMC 36 includes a plurality of memory interfaces (MEM I/Fs) 48(1)-48(P) (e.g., DDR DRAM interfaces) used to service memory access requests (not shown). In this regard, the CMC 36 in this example includes a compression controller 50. The compression controller 50 controls compressing data stored to the system memory 38 and decompressing data retrieved from the system memory 38 in response to memory access requests from the CPU blocks 14(1)-14(N) in FIG. 2. In this manner, the CPU blocks 14(1)-14(N) can be provided with a virtual memory address space greater than the actual capacity of memory accessed by the CMC 36. The compression controller 50 can also be configured to perform bandwidth compression of information provided over the internal system bus 22 to the CPU blocks 14(1)-14(N).

As will be discussed in more detail below, the compression controller 50 can perform any number of compression techniques and algorithms to provide memory bandwidth compression. A local memory 52 is provided for data structures and other information needed by the compression controller 50 to perform such compression techniques and algorithms. In this regard, the local memory 52 is provided in the form of a static random access memory (SRAM) 54. The local memory 52 is of sufficient size to be used for data structures and other data storage that may be needed for the compression controller 50 to perform compression techniques and algorithms. The local memory 52 may also be partitioned to contain a cache, such as a Level 4 (L4) cache, to provide additional cache memory for internal use within the CMC 36. Thus, an L4 controller 55 may also be provided in the CMC 36 to provide access to the L4 cache. Enhanced compression techniques and algorithms may require a larger internal memory, as will be discussed in more detail below. For example, the local memory 52 may provide 128 kilobytes (kB) of memory.

Further, as shown in FIG. 3 and as will be described in more detail below, an optional additional internal memory 56 can also be provided for the CMC 36. The additional internal memory 56 may be provided as DRAM, as an example. As will be discussed in more detail below, the additional internal memory 56 can facilitate additional or greater amounts of storage of data structures and other data than in the local memory 52 for the CMC 36 providing memory compression and decompression mechanisms to increase the memory bandwidth compression of the CPU-based system 12'. An internal memory controller 58 is provided in the CMC 36 to control memory accesses to the additional internal memory 56 for use in compression. The internal memory controller 58 is not accessible or viewable to the CPU blocks 14(1)-14(N).

As noted above, the CMC 36 in FIG. 3 may perform memory bandwidth compression, including, in some aspects, zero-line compression. The local memory 52 can be used to store larger data structures used for such compression. As discussed in greater detail below, memory bandwidth compression may reduce memory access latency and allow more CPUs 16(1), 16(2) or their respective threads to access a same number of memory channels while minimizing the impact to memory access latency. In some aspects, the number of memory channels may be reduced while achieving similar latency results compared to a greater number of memory channels if such compression was not performed by the CMC 36, which may result in reduced system level power consumption.

Each of the resources provided for memory bandwidth compression in the CMC 36 in FIG. 3, including the local memory 52 and the additional internal memory 56, can be used individually or in conjunction with each other to achieve the desired balance among resources and area, power consumption, increased memory capacity through memory capacity compression, and increased performance through memory bandwidth compression. Memory bandwidth compression can be enabled or disabled, as desired. Further, the resources described above for use by the CMC 36 can be enabled or disabled to achieve the desired tradeoffs among memory capacity and/or bandwidth compression efficiency, power consumption, and performance. Exemplary memory bandwidth compression techniques using these resources available to the CMC 36 will now be discussed.

Figure 4:
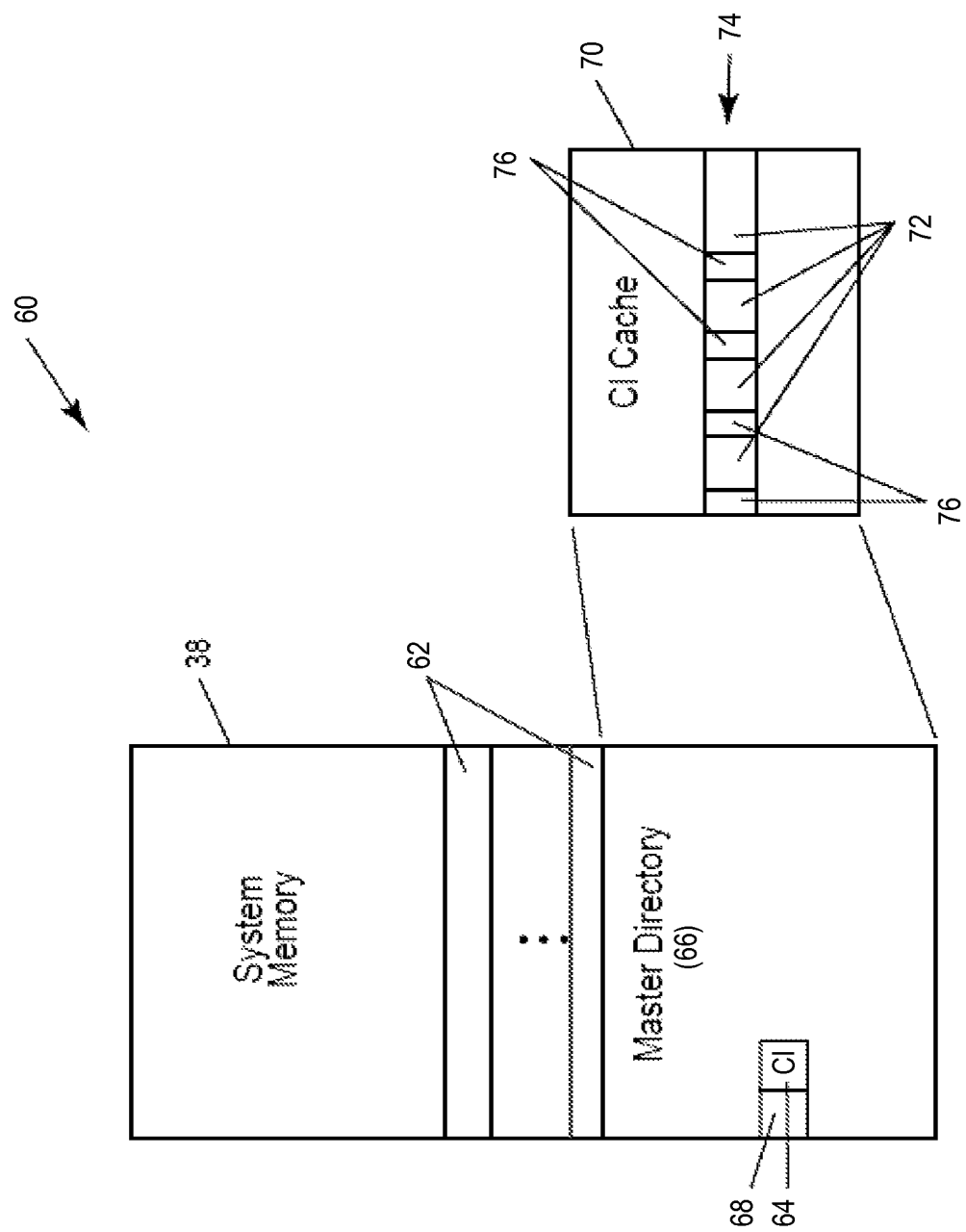
FIG. 4 is a schematic diagram of an exemplary memory bandwidth compression mechanism that may be implemented by the CMC of FIG. 3.

In this regard, FIG. 4 is a schematic diagram of an exemplary memory bandwidth compression mechanism 60 that can be implemented by the CMC 36 of FIG. 3 to provide memory bandwidth compression. In the memory bandwidth compression mechanism 60, the system memory 38 comprises a plurality of memory lines 62, each of which is associated with a physical address. Each of the plurality of memory lines 62 may be accessed by the CMC 36 using a physical address of a memory read or write request (not shown). Data (not shown) may be stored within each of the memory lines 62 in the system memory 38 in either compressed or uncompressed form. In some aspects, one or more ECC bits comprising a CI 64 may be stored in association with each memory line 62 to indicate whether the memory line 62 is stored in compressed form or not. In this manner, when performing a memory access request to the system memory 38, the CMC 36 can check the CI 64 associated with the memory line 62 corresponding to the physical address to be addressed to determine if the memory line 62 is compressed as part of processing of the memory access request.

A master directory 66 is also provided in the system memory 38. The master directory 66 contains one entry 68 per memory line 62 in the system memory 38 corresponding to the physical address. The master directory 66 also contains one (1) CI 64 per entry 68 to denote if the memory line 62 is stored as compressed in the memory line 62, and if so, a compression pattern indicating a compression length of data, in aspects in which multiple compression lengths are supported. For example, if the memory line 62 is 128 bytes in length and the data stored therein can be compressed to 64 bytes or less, the CI 64 in the master directory 66 corresponding to the data stored in the system memory 38 may be set to indicate that the data is stored in the first 64 bytes of the 128 byte memory line 62.

With continuing reference to FIG. 4, during a write operation, the CMC 36 can compress a memory block to be written into the system memory 38. For example, data (e.g., 128 bytes, or 256 bytes) is compressed. If the compressed data block is smaller than or equal to the memory block size of the system memory 38 (e.g., 64 bytes), then 64 bytes can be written, otherwise 128 bytes are written. 256 bytes could be written as 64, 128, 192, or 256 bytes, depending on the compressed data size. The CI 64 stored in one or more ECC bits associated with the memory line 62 in the system memory 38 can also be set to denote if the data at the memory line 62 is compressed or not.

During a read operation example, the CMC 36 can read the CI 64 from the master directory 66 to determine whether the data to be read was compressed in the system memory 38. Based on the CI 64, the CMC 36 can read the data to be accessed from the system memory 38. If the data to be read was compressed in the system memory 38 as indicated by the CI 64, the CMC 36 can read the entire compressed data block with one memory read operation. If the portion of data read was not compressed in the system memory 38, memory access latency may be negatively impacted because the additional portions of the memory line 62 to be read must also be read from the system memory 38. In some aspects, a training mechanism may be employed, for a number of address ranges, in which the CMC 36 may be configured to "learn" whether it is better to read the data in two accesses from the system memory 38 in a given set of circumstances, or whether it is better to read the full amount of data from the system memory 38 to avoid the latency impact.

In the example of FIG. 4, a CI cache 70 may also be provided in a separate cache outside of the system memory 38. The CI cache 70 provides one cache entry 72 per memory line 62 in the system memory 38 to denote if a memory line 62 in the system memory 38 is stored in compressed form or not. In this manner, when performing a memory access request to the system memory 38, the CMC 36 can first check the cache entry 72 in the CI cache 70 corresponding to the physical address to be addressed to determine if the memory line 62 at the physical address in the system memory 38 is compressed as part of processing of the memory access request without having to read the memory line 62. Thus, if the CI cache 70 indicates that the memory line 62 is stored compressed, the CMC 36 does not have to read out the entire memory line 62, thus reducing latency. If the CI cache 70 indicates that the memory line 62 is stored uncompressed, the CMC 36 can read out the entire memory line 62. If a miss occurs in the CI cache 70, the corresponding CI 64 stored in the master directory 66 can be consulted and loaded into the CI cache 70 for subsequent memory access requests to the same physical address.

In some aspects, the CI cache 70 may be organized as a conventional cache. The CI cache 70 may contain a tag array and may be organized as an n-way associative cache, as a non-limiting example. The CMC 36 may implement an eviction policy with respect to the CI cache 70. In the CI cache 70 shown in FIG. 4, each cache line 74 may store multiple cache entries 72. Each cache entry 72 may contain a CI 76 to indicate if the memory line 62 in the system memory 38 associated with the cache entry 72 is compressed, and/or to represent a compression pattern indicating compression size for the data corresponding to the cache entry 72. For example, the CI 76 may comprise two (2) bits representing four (4) potential compression sizes (e.g., 32, 64, 96, or 128 bytes). Note that in this example, the CI 64 is redundant, because this information is also stored in the CI 76 in the cache entries 72. For example, if the memory line 62 is 128 bytes in length and the data stored therein can be compressed to 64 bytes or less, the CI 76 in the cache entry 72 in the CI cache 70 corresponding to the memory line 62 in the system memory 38 may be set to indicate that the data is stored in the first 64 bytes of a 128 byte memory line 62.

Figure 5:
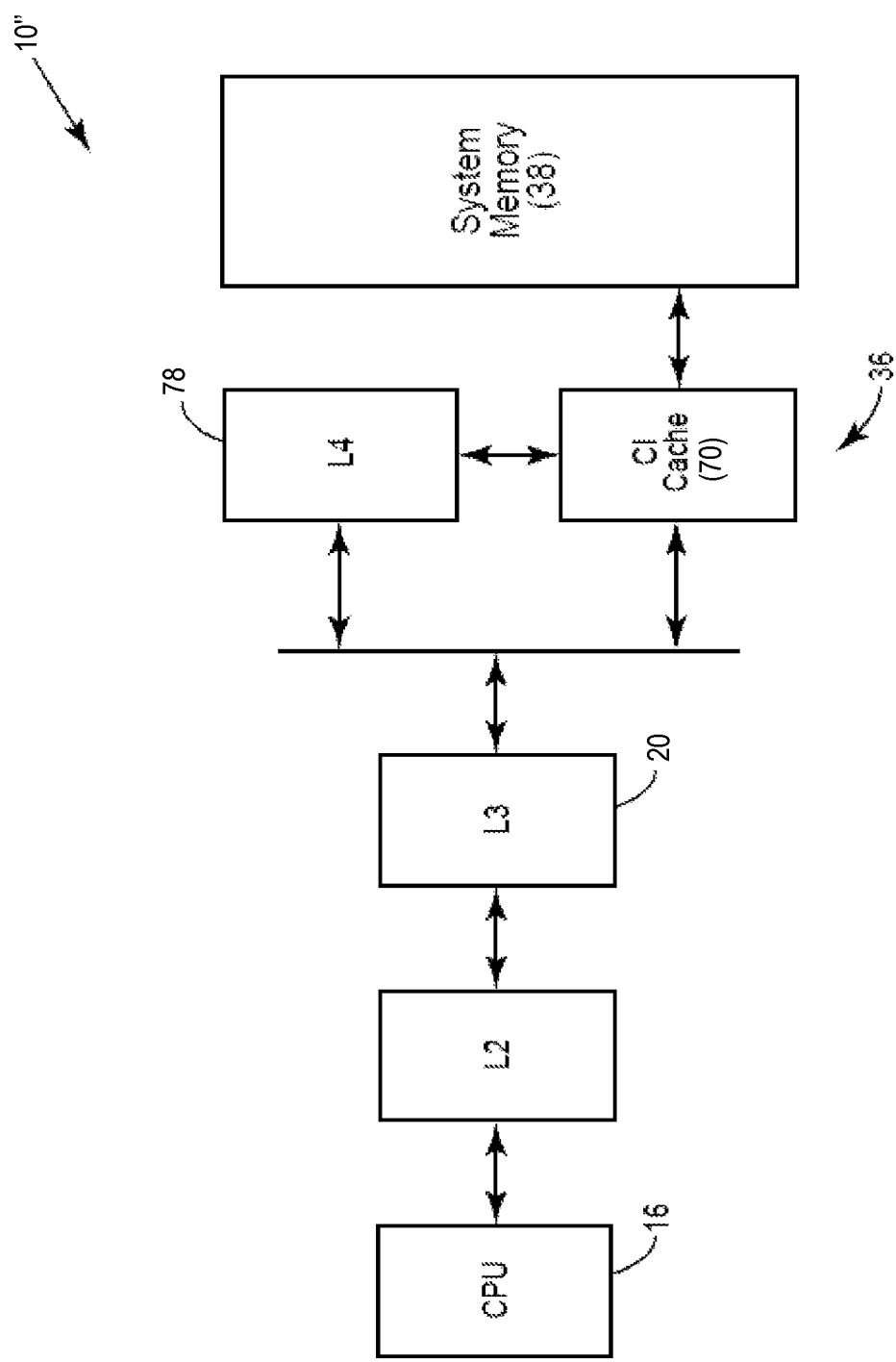
FIG. 5 illustrates an example of the SoC of FIG. 1 that includes an optional Level 4 (L4) cache to compensate for performance loss due to address translation in the CMC.

It may also be desired to provide an additional cache for memory bandwidth compression mechanism. In this regard, FIG. 5 illustrates an example of an alternative SoC 10" like the SoC 10' in FIG. 2, but the SoC 10" in FIG. 5 additionally includes an optional cache 78, which is an L4 cache in this example. The CMC 36 can look up a physical address in both the L4 cache 78 and the CI cache 70 concurrently to minimize latency. The addresses in the L4 cache 78 are physical addresses that are uncompressed. Upon a physical address hit in the L4 cache 78, the physical address lookup in the CI cache 70 is redundant. Upon a physical address miss in the L4 cache 78, a physical address lookup in the CI cache 70 is required to obtain the data from the system memory 38. Also, to avoid additional latency of a CPU 16 accessing both the L4 cache 78 and the CI cache 70, the L4 cache 78 and the CI cache 70 may be primed.

Figure 6A:
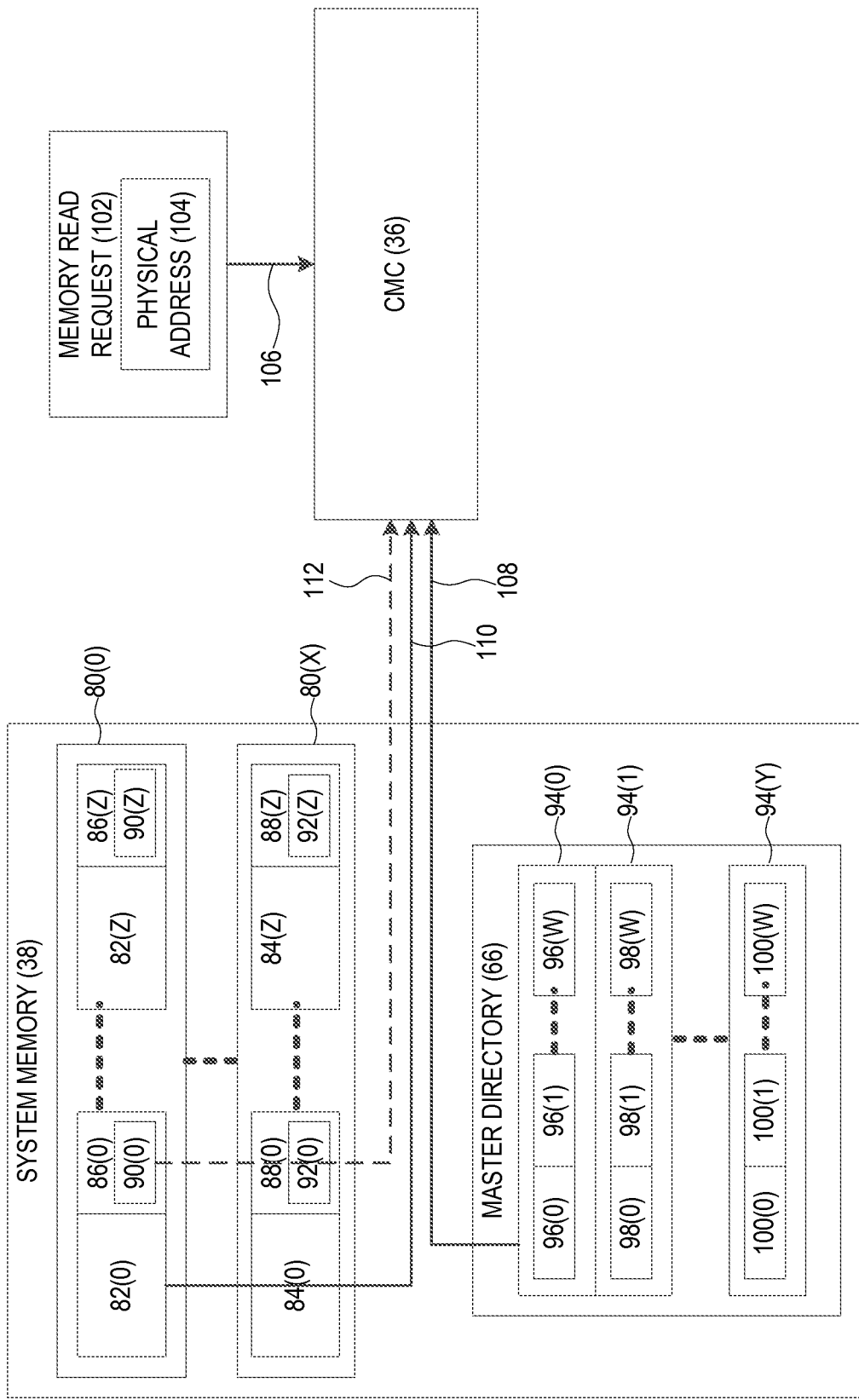
FIGS. 6A and 6B are diagrams illustrating exemplary communications flows during memory read operations and memory write operations, respectively, and exemplary elements of a system memory and a master directory of FIG. 4 that may be accessed by the CMC of FIG. 3 for providing memory bandwidth compression.
Figure 6B:
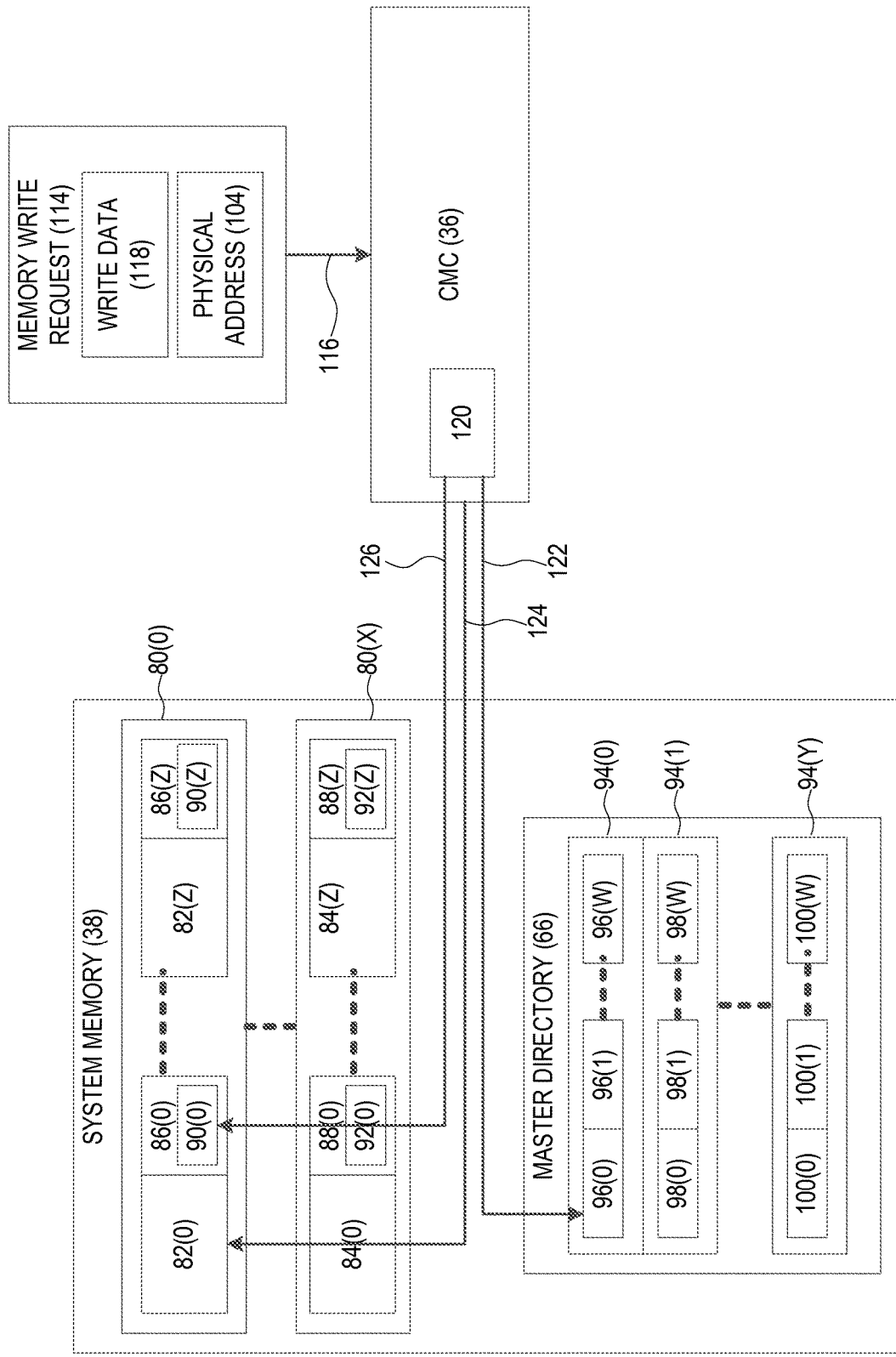

FIGS. 6A and 6B are provided to illustrate exemplary communications flows and exemplary elements of the system memory 38 and the master directory 66 of FIG. 4 that may be accessed by the CMC 36 of FIG. 3 for providing memory bandwidth compression. In particular, FIG. 6A illustrates exemplary communications flows during a memory read operation, while FIG. 6B illustrates exemplary communications flows during a memory write operation, respectively. In describing FIGS. 6A and 6B, elements of FIGS. 3 and 4 are referenced for the sake of clarity.

In FIGS. 6A and 6B, the system memory 38 includes a plurality of memory lines 80(0)-80(X) for storing compressed and uncompressed data. The memory lines 80(0)-80(X) are each subdivided into respective memory blocks 82(0)-82(Z) and 84(0)-84(Z), as determined by an underlying memory architecture of the system memory 38. In some aspects, the size of each of the memory blocks 82(0)-82(Z), 84(0)-84(Z) represents a smallest amount of data that may be read from the system memory 38 in a memory read operation. For example, in some exemplary memory architectures, each of the memory lines 80(0)-80(X) may comprise 128 bytes of data, subdivided into two 64-byte memory blocks 82(0)-82(Z), 84(0)-84(Z). Some aspects may provide that each of the memory lines 80(0)-80(X) may comprise more or fewer bytes of data (e.g., 256 bytes or 64 bytes, as non-limiting examples). Similarly, according to some aspects, the memory blocks 82(0)-82(Z), 84(0)-84(Z) within the memory lines 80(0)-80(X) may be larger or smaller (e.g., 128 bytes or 32 bytes, as non-limiting examples). In some aspects, a memory read operation may read fewer bytes than the size of each of the memory blocks 82(0)-82(Z), 84(0)-84(Z), but still consume the same amount of memory bandwidth as one of the memory blocks 82(0)-82(Z), 84(0)-84(Z).

Each of the memory blocks 82(0)-82(Z), 84(0)-84(Z) is associated with one or more corresponding ECC bits 86(0)-86(Z), 88(0)-88(Z). ECC bits such as the ECC bits 86(0)-86(Z), 88(0)-88(Z) are used conventionally to detect and correct commonly encountered types of internal data corruption within the memory blocks 82(0)-82(Z), 84(0)-84(Z). In the example of FIGS. 6A and 6B, one or more of the ECC bits 86(0)-86(Z), 88(0)-88(Z) are repurposed to store CIs 90(0)-90(Z), 92(0)-92(Z) for the respective memory blocks 82(0)-82(Z), 84(0)-84(Z). Although the ECC bits 86(0)-86(Z), 88(0)-88(Z) in FIGS. 6A and 6B are depicted as being adjacent to their respective memory blocks 82(0)-82(Z), 84(0)-84(Z), it is to be understood that the ECC bits 86(0)-86(Z), 88(0)-88(Z) may be located elsewhere within the system memory 38.

In the example of FIGS. 6A and 6B, the system memory 38 also includes the master directory 66, which includes multiple master directory memory blocks 94(0)-94(Y). Each of the master directory memory blocks 94(0)-94(Y) is the same size as the memory blocks 82(0)-82(Z), 84(0)-84(Z). The master directory memory blocks 94(0)-94(Y) store CIs 96(0)-96(W), 98(0)-98(W), 100(0)-100(W), each of which corresponds to a physical address of one of the memory blocks 82(0)-82(Z), 84(0)-84(Z). As discussed in greater detail below, in some aspects, the CIs 90(0)-90(Z), 92(0)-92(Z) stored in the ECC bits 86(0)-86(Z), 88(0)-88(Z) and the CIs 96(0)-96(W), 98(0)-98(W), 100(0)-100(W) stored in the master directory memory blocks 94(0)-94(Y) may be maintained so as to always store the same value for a given one of the memory blocks 82(0)-82(Z), 84(0)-84(Z). Some aspects may provide that the CIs 90(0)-90(Z), 92(0)-92(Z) stored in the ECC bits 86(0)-86(Z), 88(0)-88(Z) may be updated more frequently than the CIs 96(0)-96(W), 98(0)-98(W), 100(0)-100(W) in the master directory memory blocks 94(0)-94(Y).

The CIs 90(0)-90(Z), 92(0)-92(Z) and the CIs 96(0)-96(W), 98(0)-98(W), 100(0)-100(W) each may comprise one or more bits that indicate a compression status of data stored at a corresponding memory block 82(0)-82(Z), 84(0)-84(Z) of the system memory 38. In some aspects, each of the CIs 90(0)-90(Z), 92(0)-92(Z) and the CIs 96(0)-96(W), 98(0)-98(W), 100(0)-100(W) may comprise a single bit indicating whether data in the corresponding memory block 82(0)-82(Z), 84(0)-84(Z) is compressed or uncompressed. According to some aspects, each of the CIs 90(0)-90(Z), 92(0)-92(Z) and the CIs 96(0)-96(W), 98(0)-98(W), 100(0)-100(W) may comprise multiple bits that may be used to indicate a compression pattern (e.g., a number of the memory blocks 82(0)-82(Z), 84(0)-84(Z) occupied by the compressed data, as a non-limiting example) for each of the corresponding memory blocks 82(0)-82(Z), 84(0)-84(Z).

In the example of FIG. 6A, a memory read request 102 specifying a physical address 104 is received by the CMC 36, as indicated by arrow 106. For purposes of illustration, it is assumed in this example that the physical address 104 corresponds to the memory block 82(0), which is a 64-byte subdivision of the 128-byte memory line 80(0). At the time the memory read request 102 is received, the CMC 36 is unaware of whether the data stored at the memory block 82(0) is compressed or not. The CMC 36 could proceed with reading the entire memory line 80(0), but if the requested data is stored in compressed form in only the memory block 82(0), a read of the memory block 82(Z) would be unnecessary, and would result in increased memory access latency. Alternatively, the CMC 36 could read only memory block 82(0), determine based on its contents whether the data stored therein is compressed or not, and then read the memory block 82(Z) if the data is uncompressed. However, this approach may also result in increased memory access latency resulting from issuing the two separate memory read operations. Thus, without knowing the compression status of the memory block 82(0), the CMC 36 risks executing unnecessary memory read operations that may negatively impact memory access latency.

By using the CIs 90(0)-90(Z), 92(0)-92(Z) and/or the CIs 96(0)-96(W), 98(0)-98(W), 100(0)-100(W), the CMC 36 may determine how many memory blocks 82(0)-82(Z) should be read to ensure that all data (compressed or uncompressed) for a given memory read request 102 is efficiently read from the system memory 38. Thus, after receiving the memory read request 102, the CMC 36 may read the master directory memory block 94(0) of the master directory 66 to access the CI 96(0) corresponding to the physical address 104 of the memory block 82(0), as indicated by arrow 108. The CI 96(0) may then be used by the CMC 36 to determine how many memory blocks 82(0)-82(Z) within the memory line 80(0) to read to ensure that the data requested by the memory read request 102 is efficiently retrieved.

In some aspects, the CMC 36 may determine how many memory blocks 82(0)-82(X) to read by determining a compression pattern (not shown) indicated by the CI 96(0). In the example above, the CI 96(0) may be a single bit indicating that data is compressed (i.e., only the memory block 82(0) should be read) or uncompressed (i.e., both the memory blocks 82(0) and 82(Z) should be read). According to aspects in which the memory lines 80(0)-80(X) of the system memory 38 each contain more than two memory blocks 82(0)-82(Z), 84(0)-84(Z), the CI 96(0) may comprise multiple bits indicating how many memory blocks 82(0)-82(Z) contain compressed data. For example, if the memory lines 80(0)-80(X) were 256-byte memory lines subdivided into four 64-byte memory blocks 82(0)-82(Z), the CI 96(0) may indicate that compressed data is stored in 64 bytes, 128 bytes, or 192 bytes (corresponding to the memory block 82(0), the memory blocks 82(0)-82(1), and the memory blocks 82(0)-82(2), respectively). Based on the CI 96(0), the CMC 36 may then issue an appropriate number of memory read operations to read the determined number of memory blocks 82(0)-82(Z) within the memory line 80(0), as indicated by arrow 110. Some aspects may provide that the CMC 36 may determine that the compression pattern indicated by the CI 96(0) comprises a zero-line indicator, which indicates to the CMC 36 that data stored at the physical address 104 is made up entirely of zero values. In such case, the CMC 36 may read zero memory blocks 82(0)-82(Z). According to some aspects, the CMC 36 may determine that the compression pattern indicated by the CI 96(0) comprises an indicator of other fixed data patterns stored at the physical address 104 (such as all ones (1s), as a non-limiting example).

In some aspects, it may be desirable to read the CIs 96(0)-96(W), 98(0)-98(W), 100(0)-100(W) from the master directory 66 for only a certain percentage of memory read requests 102 received by the CMC 36. For example, in some aspects, the master directory 66 may only be accessed for ten percent (10%) of memory read requests 102 received by the CMC 36. In such aspects, upon receiving the memory read request 102, the CMC 36 may probabilistically determine (e.g., based on a random number generator (not shown)) whether to read the CI 96(0) for the memory block 82(0) from the master directory 66, or alternatively whether to read the CI 90(0) for the memory block 82(0) from the ECC bits 86(0). In the latter case, the CMC 36 may read the CI 90(0), as indicated by dashed arrow 112, and use the CI 90(0) in determining how many memory blocks 82(0)-82(Z) to read from the memory line 80(0).

Referring now to FIG. 6B, the CMC 36 receives a memory write request 114, as indicated by arrow 116. The memory write request 114 includes both write data 118 to be written to the system memory 38, as well as the physical address 104 of the system memory 38 to which the write data 118 is to be written. For purposes of illustration, it is again assumed that the physical address 104 corresponds to the memory block 82(0). Upon receiving the memory write request 114, the CMC 36 may carry out operations to compress the write data 118, and based on the results of compressing the write data 118, may determine a compression pattern for the write data 118. The compression pattern may indicate, as non-limiting examples, whether or not the write data 118 was successfully compressed, and/or a number of memory blocks 82(0)-82(Z) occupied by the compressed write data 118. Based on the compression pattern, the CMC 36 generates a CI 120 for the write data 118.

The CMC 36 may then update the CI 96(0) stored in the master directory 66 for the physical address 104 of the memory block 82(0) with the generated CI 120, as indicated by arrow 122. According to some aspects, the master directory 66 may be updated for only a certain percentage of memory write requests 114 received by the CMC 36. For example, in some aspects, the master directory 66 may only be updated for ten percent (10%) of memory write requests 114 received by the CMC 36. Accordingly, in such aspects, the CMC 36 may probabilistically determine (e.g., based on a random number generator (not shown)) whether to update the stored CI 96(0) for the memory block 82(0) in the master directory 66. If not, this operation may be omitted. The CMC 36 then writes the write data 118 to one or more of the memory blocks 82(0)-82(Z), as indicated by arrow 124. The CMC 36 also writes the generated CI 120 into the CIs 90(0)-90(Z) stored in the ECC bits 86(0)-86(Z) of the one or more memory blocks 82(0)-82(Z) to which the write data 118 was written, as indicated by arrow 126.

Figure 7:
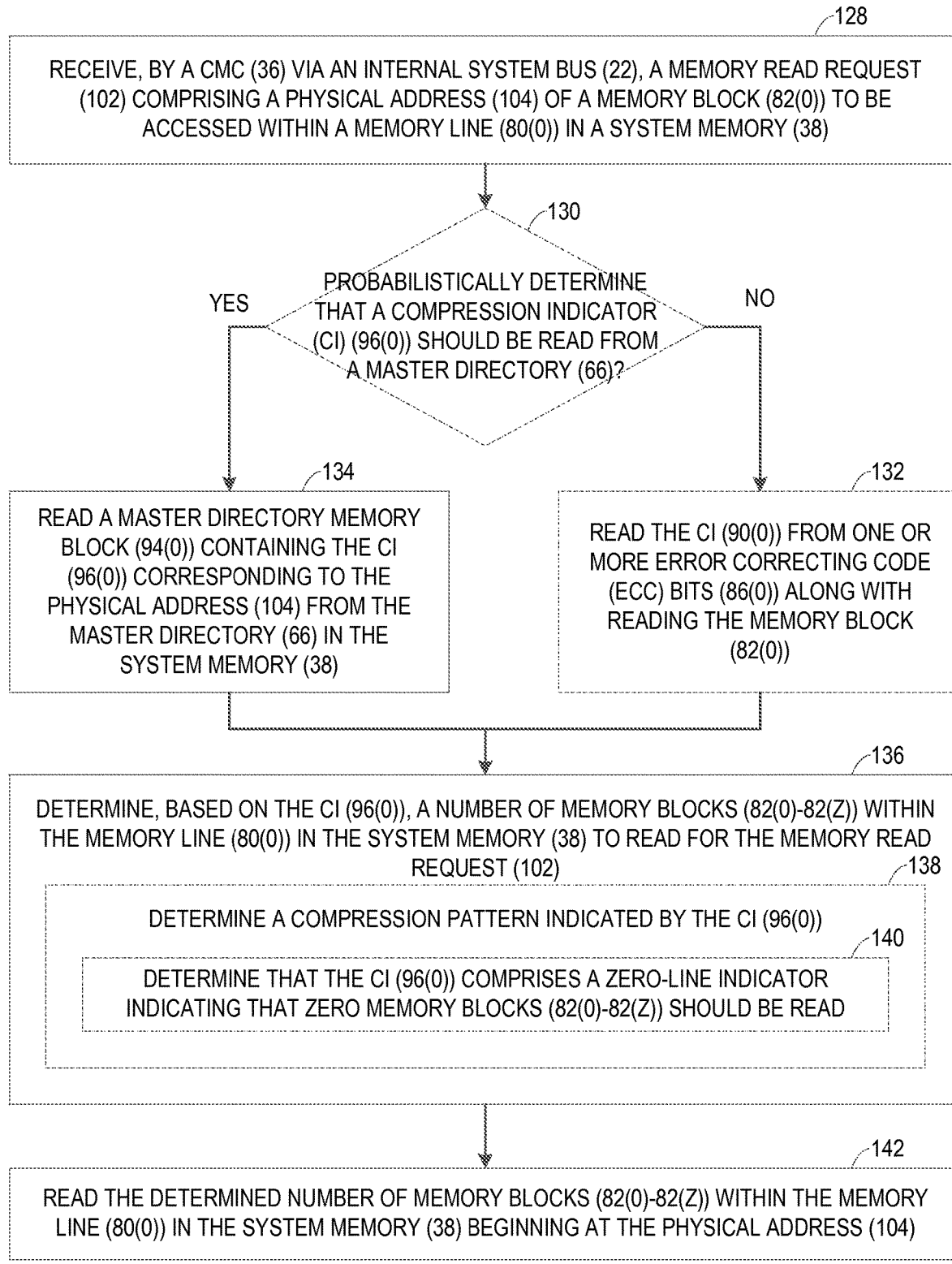
FIG. 7 is a flowchart illustrating exemplary operations for performing a memory read operation by the CMC of FIG. 6A using memory bandwidth compression.

FIG. 7 is a flowchart that illustrates exemplary operations for performing a memory read operation by the CMC 36 of FIG. 3 using memory bandwidth compression, as discussed with respect to FIG. 6A. For the sake of clarity, elements of FIGS. 2, 3, and 6A are referenced in describing FIG. 7. In FIG. 7, operations begin with the CMC 36 receiving, via the internal system bus 22, the memory read request 102 comprising the physical address 104 of the memory block 82(0) to be accessed within the memory line 80(0) in the system memory 38 (block 128). In some aspects, the CMC 36 optionally may probabilistically determine whether the CI 96(0) should be read from the master directory 66 (block 130). If the CMC 36 determines that the CI 96(0) should not be read from the master directory 66, the CMC 36 reads the CI 90(0) from the one or more ECC bits 86(0) along with reading the memory block 82(0), and uses the CI 90(0) as the CI 96(0) (block 132). However, if the CMC 36 is not using probabilistic determination, or if the CMC 36 probabilistically determines at decision block 130 that the CI 96(0) should be read from the master directory 66, the CMC 36 reads the master directory memory block 94(0) containing the CI 96(0) corresponding to the physical address 104 from the master directory 66 in the system memory 38 (block 134).

The CMC 36 then determines, based on the CI 96(0), a number of memory blocks 82(0)-82(Z) within the memory line 80(0) in the system memory 38 to read for the memory read request 102 (block 136). In some aspects, the operations of block 136 for determining the number of memory blocks 82(0)-82(Z) to read may comprise determining a compression pattern indicated by the CI 96(0) (block 138). For example, the CMC 36 may determine that the CI 96(0) comprises a zero-line indicator indicating that zero memory blocks 82(0)-82(Z) should be read (block 140). The CMC 36 then reads the determined number of memory blocks 82(0)-82(Z) within the memory line 80(0) in the system memory 38 beginning at the physical address 104 (block 142).

Figure 8:
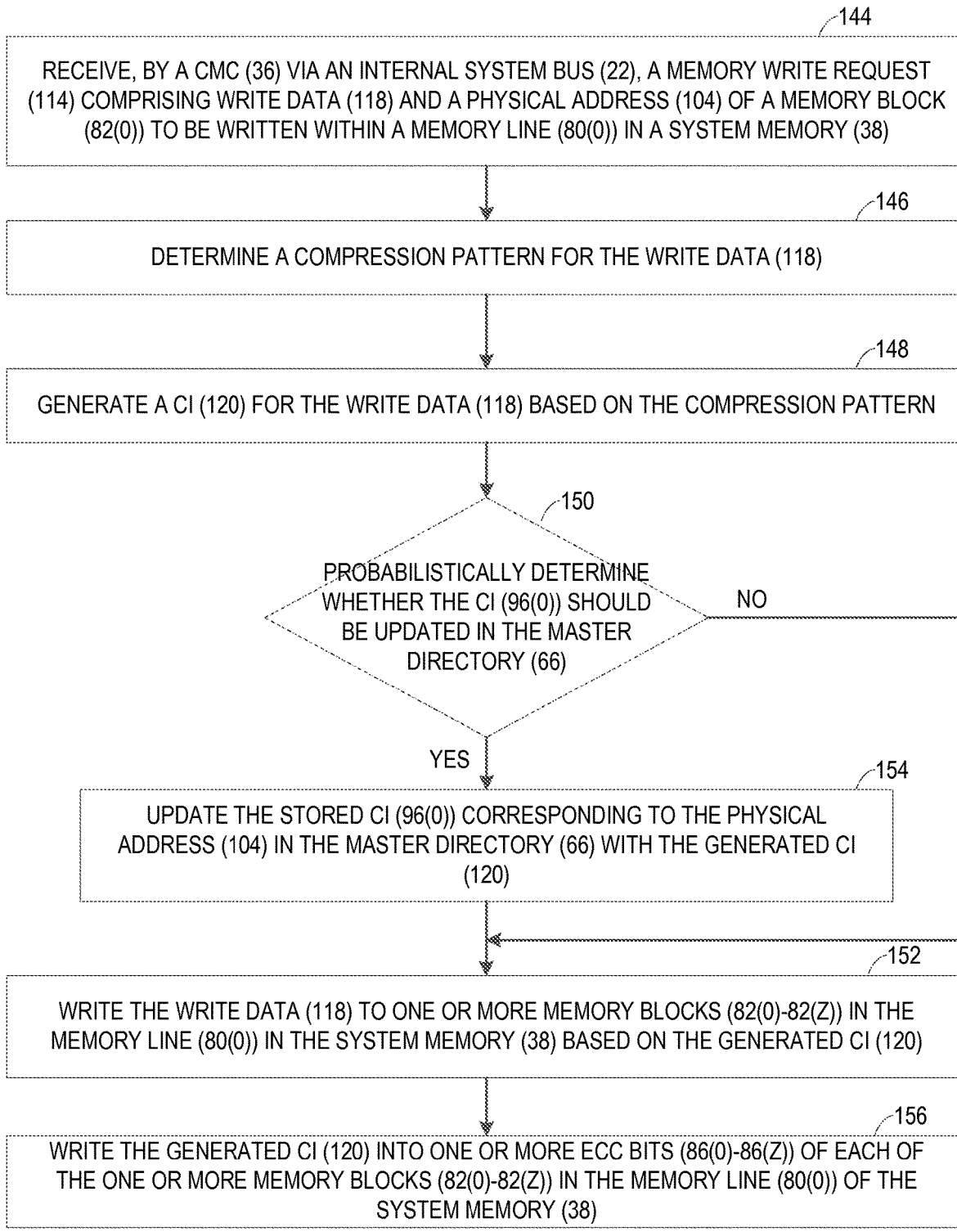
FIG. 8 is a flowchart illustrating exemplary operations for performing a memory write operation by the CMC of FIG. 6B using memory bandwidth compression.

To illustrate exemplary operations for performing a memory write operation by the CMC 36 of FIG. 3 using memory bandwidth compression, as discussed above with respect to FIG. 6B, FIG. 8 is provided. In this regard, elements of FIGS. 2, 3, and 6B are referenced in describing FIG. 8 for the sake of clarity. Operations in FIG. 8 begin with the CMC 36 receiving, via the internal system bus 22, the memory write request 114 comprising the write data 118 and the physical address 104 of the memory block 82(0) to be written within the memory line 80(0) in the system memory 38 (block 144). After attempting to compress the write data 118, the CMC 36 determines a compression pattern for the write data 118 (e.g., whether the write data 118 was compressed, and/or how many memory blocks 82(0)-82(Z) are required to store the write data 118) (block 146). Based on the compression pattern, the CMC 36 generates a CI 120 for the write data 118 based on the compression pattern (block 148).

According to some aspects, the CMC 36 optionally may probabilistically determine whether the CI 96(0) stored in the master directory 66 should be updated (block 150). If the CMC 36 determines that the stored CI 96(0) in the master directory 66 should not be updated, processing resumes at block 152 of FIG. 8. However, if the CMC 36 determines at decision block 150 that the stored CI 96(0) in the master directory 66 should be updated, or if the CMC 36 is not employing probabilistic determination, the CMC 36 updates the stored CI 96(0) corresponding to the physical address 104 in the master directory 66 with the generated CI 120 (block 154).

The CMC 36 next writes the write data 118 to one or more of the memory blocks 82(0)-82(Z) in the memory line 80(0) in the system memory 38 based on the generated CI 120 (block 152). The CMC 36 also writes the generated CI 120 into one or more ECC bits 86(0)-86(Z) of each of the memory blocks 82(0)-82(Z) in the memory line 80(0) of the system memory 38 (block 156). In some aspects, the generated CI 120 is written into the ECC bits 86(0) as part of the same memory write operation that writes the write data 118 to the first memory block 82(0).

Figure 9A:
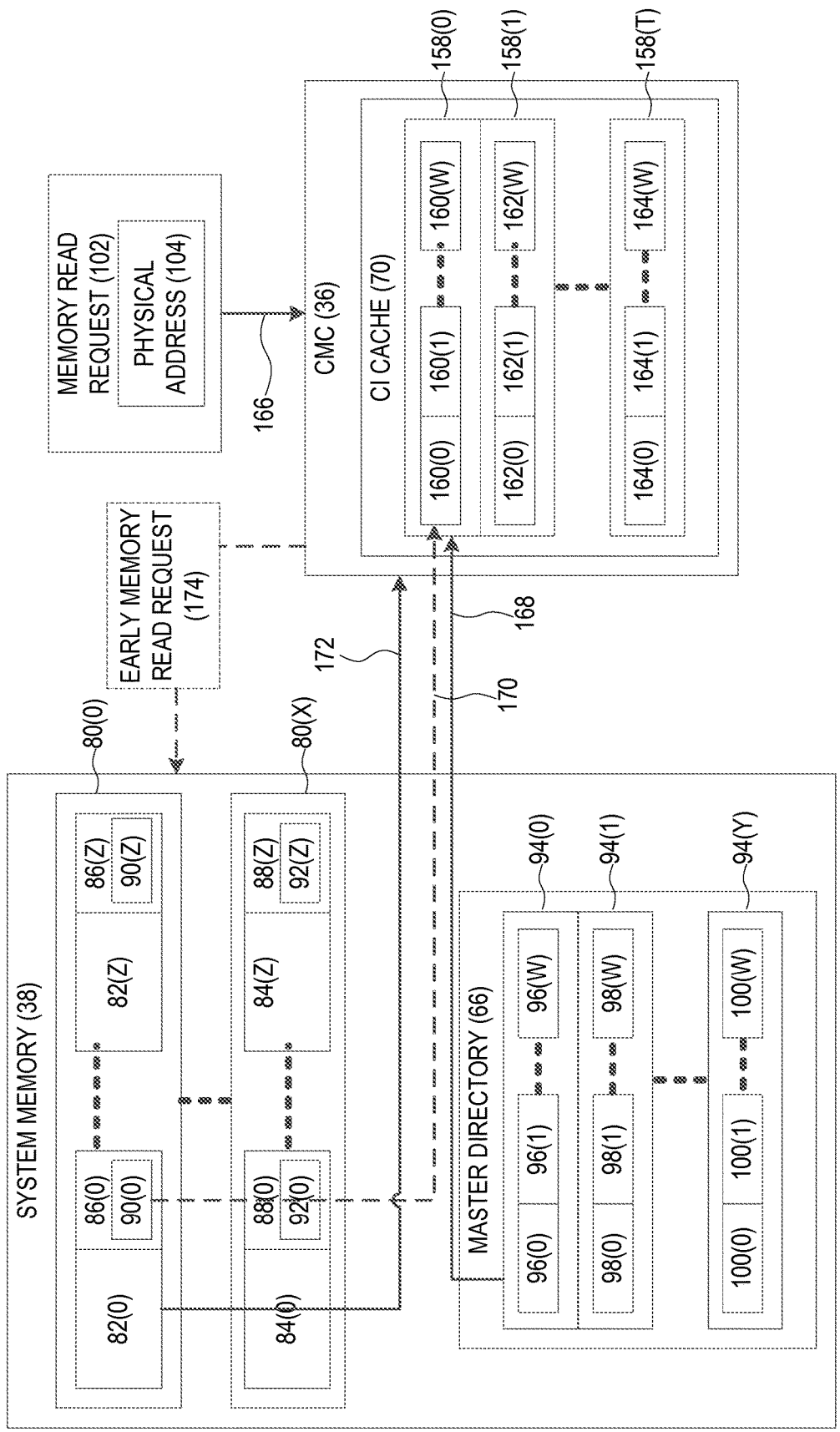
FIGS. 9A and 9B are diagrams illustrating exemplary communications flows during memory read operations and memory write operations, respectively, and exemplary elements of a compression indicator (CI) cache provided by some aspects of the CMC in FIG. 3 for providing memory bandwidth compression.
Figure 9B:
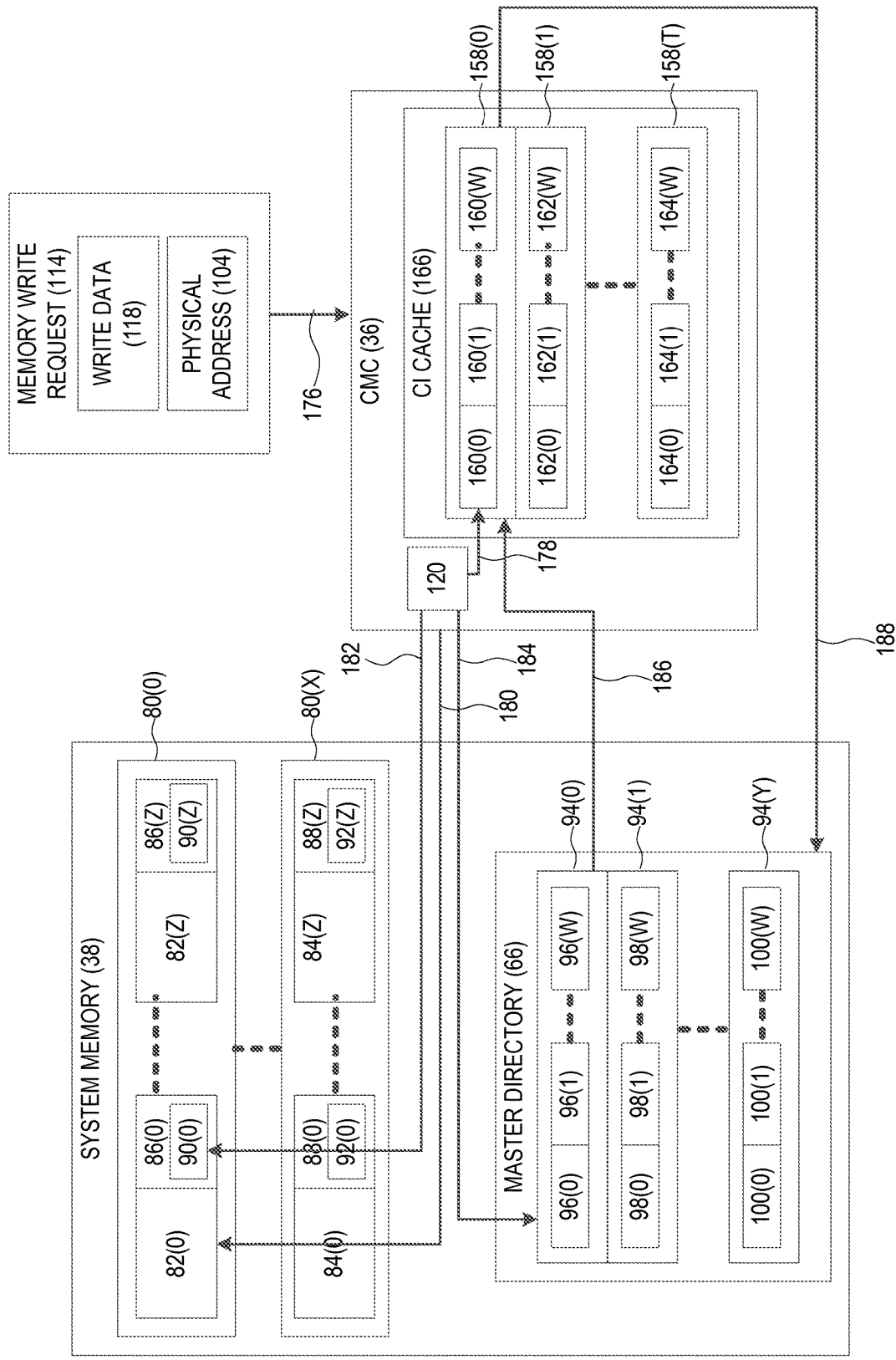

As noted above with respect to FIG. 4, memory bandwidth compression provided by the CMC 36 may be further enhanced in some aspects through the use of the CI cache 70 of FIG. 4. In this regard, FIGS. 9A and 9B are provided to illustrate exemplary communications flows and exemplary elements of the CI cache 70 that may be accessed by the CMC 36 of FIG. 3 for providing memory bandwidth compression. In particular, FIGS. 9A and 9B illustrate exemplary communications flows during a memory read operation and a memory write operation, respectively, using the CI cache 70. In describing FIGS. 9A and 9B, elements of FIGS. 3, 4, 6A, and 6B are referenced for the sake of clarity.

As seen in FIG. 9A, the CI cache 70 of the CMC 36 includes multiple CI cache entries 158(0)-158(T) storing cached CIs 160(0)-160(W), 162(0)-162(W), and 164(0)-164(W). Each of the cache entries 158(0)-158(T) is the same size as the master directory memory blocks 94(0)-94(Y), and in some aspects are configured to store one of the master directory memory blocks 94(0)-94(Y) that is read in the course of a memory read operation or a memory write operation by the CMC 36. In this manner, the CMC 36 may access the cached CIs 160(0)-160(W), 162(0)-162(W), and 164(0)-164(W) on subsequent memory read operations and memory write operations, rather than having to access the system memory 38 to read the CIs 90(0)-90(Z), 92(0)-92(Z) and/or the CIs 96(0)-96(W), 98(0)-98(W), 100(0)-100(W). Because the CMC 36 may read from and write to the CI cache 70 much faster than reading from and writing to the system memory 38, the use of the CI cache 70 may enable the CMC 36 to further decrease memory access latency.

In the example of FIG. 9A, the CMC 36 providing the CI cache 70 receives the memory read request 102 comprising the physical address 104, as indicated by arrow 166. It is assumed that the physical address 104 corresponds to the memory block 82(0) of the memory line 80(0) of the system memory 38. The CMC 36 may then determine whether the physical address 104 corresponds to one of the CI cache entries 158(0)-158(T). If one of the CI cache entries 158(0)-158(T), such as the CI cache entry 158(0), corresponds to the physical address 104 of the memory block 82(0) (i.e., a cache "hit"), then the CMC 36 has identified the CI cache entry 158(0) that includes a CI indicator, such as the CI 160(0), for the memory block 82(0). The CMC 36 then reads the CI 160(0) from the CI cache entry 158(0) of the CI cache 70, and determines a number of memory blocks 82(0)-82(Z) to read based on the CI 160(0) as discussed above with respect to FIG. 6A.

However, if the CMC 36 determines that the physical address 104 does not correspond to any of the CI cache entries 158(0)-158(T), the CMC 36 may read the master directory memory block 94(0) of the master directory 66 to access the CI 96(0) corresponding to the physical address 104 of the memory block 82(0), as indicated by arrow 168. As noted above, in some aspects it may be desirable for the CMC 36 to read the master directory 66 for only a certain percentage of memory read requests 102 received by the CMC 36. Accordingly, in such aspects, the CMC 36 may probabilistically determine (e.g., based on a random number generator (not shown)) whether to read the master directory memory block 94(0) from the master directory 66, or alternatively to read the CI 90(0) for the memory block 82(0) from the ECC bits 86(0). In the latter case, the CMC 36 may read the CI 90(0), as indicated by dashed arrow 170. The CMC 36 may then use the CI 90(0) without further updating the CI cache 70.

The CMC 36 may then write the master directory memory block 94(0) into the CI cache 70 as a new CI cache entry 158(0). In some aspects, before writing the master directory memory block 94(0) as the new CI cache entry 158(0), the CI cache 70 may first determine whether a current CI cache entry 158(0) must be evicted. If so, the CI cache 70 may further determine whether the current CI cache entry 158(0) has been modified since being written into the CI cache 70 (e.g., by determining whether at least one cached CI 160(0)-160(W) has been changed since being read from the master directory 66). In some aspects, the CI cache 70 may determine whether the current CI cache entry 158(0) has been modified by checking to see if a dirty bit (not shown) associated with the current CI cache entry 158(0) has been set. If the current CI cache entry 158(0) has been modified, the CMC 36 writes the current CI cache entry 158(0) to the corresponding one of the master directory memory blocks 94(0)-94(Y). The CMC 36 then reads the CI 160(0) from the CI cache entry 158(0) of the CI cache 70, and determines a number of memory blocks 82(0)-82(Z) to read based on the CI 160(0) as discussed above. The determined number of memory blocks 82(0)-82(Z) are then read by the CMC 36, as indicated by arrow 172.

In some aspects, the CMC 36 may issue an early memory read request 174, based on the memory read request 102, to the system memory 38 concurrently with determining whether the physical address 104 corresponds to one of the CI cache entries 158(0)-158(T). The early memory read request 174 may be processed in parallel with the CMC 36 determining the number of memory blocks 82(0)-82(Z) to read based on the CI 160(0). Upon determining the number of memory blocks 82(0)-82(Z) to read, the early memory read request 174 may be modified based on the CI 160(0). As a non-limiting example, the early memory read request 174 may be modified to read the determined number of memory blocks 82(0)-82(Z). In this manner, additional memory bandwidth compression and decreased memory access latency may be provided through parallel processing of the early memory read request 174 and the CI cache 70 reads and/or writes.

Furthermore, according to some aspects discussed above with respect to FIG. 5, the CMC 36 may also perform a cache read operation (not shown) to look up the physical address 104 in the L4 cache 78 concurrently with determining whether the physical address 104 corresponds to one of the CI cache entries 158(0)-158(T) in the CI cache 70. By doing so, the CMC 36 may further minimize memory access latency.

Referring now to FIG. 9B, the CMC 36 receives the memory write request 114, as indicated by arrow 176. The memory write request 114 includes both the write data 118 to be written to the system memory 38, as well as the physical address 104 of the system memory 38 to which the write data 118 is to be written. It is again assumed for purposes of illustration that the physical address 104 corresponds to the memory block 82(0). Upon receiving the memory write request 114, the CMC 36 may carry out operations to compress the write data 118, and based on the results of compressing the write data 118, may determine a compression pattern for the write data 118. The compression pattern may indicate, as non-limiting examples, whether or not the write data 118 was successfully compressed, and/or a number of memory blocks 82(0)-82(Z) occupied by the compressed write data 118. Based on the compression pattern, the CMC 36 generates the CI 120 for the write data 118.

The CMC 36 may then determine whether the physical address 104 corresponds to one of the CI cache entries 158(0)-158(T). If one of the CI cache entries 158(0)-158(T), such as the CI cache entry 158(0), corresponds to the physical address 104 of the memory block 82(0) (i.e., a cache "hit"), then the CMC 36 has identified the CI cache entry 158(0) that includes a CI indicator, such as the CI 160(0), for the memory block 82(0). Accordingly, the CMC 36 updates the CI 160(0) of the CI cache entry 158(0) with the generated CI 120, as indicated by arrow 178. The CMC 36 next writes the write data 118 to one or more of the memory blocks 82(0)-82(Z) in the memory line 80(0), as indicated by arrow 180. The CMC 36 also writes the generated CI 120 into one or more of the ECC bits 86(0)-86(Z) of the one or more of the memory blocks 82(0)-82(Z) to which the write data 118 was written, as indicated by arrow 182. According to some aspects, the generated CI 120 is written into the ECC bits 86(0) as part of the same memory write operation that writes the write data 118 to the first memory block 82(0).

However, if the CMC 36 determines that the physical address 104 does not correspond to any of the CI cache entries 158(0)-158(T) (i.e., a cache miss), the CMC 36 may update the stored CI 96(0) corresponding to the physical address 104 in the master directory 66 with the generated CI 120, as indicated by arrow 184. The CMC 36 may then write the master directory memory block 94(0) into the CI cache 70 as a new CI cache entry 158(0), as indicated by arrow 186. In some aspects, before writing the master directory memory block 94(0) as the new CI cache entry 158(0), the CI cache 70 may first determine whether a current CI cache entry 158(0) must be evicted. If so, the CI cache 70 may further determine whether the current CI cache entry 158(0) has been modified since being written into the CI cache 70. In some aspects, the CI cache 70 may determine whether the current CI cache entry 158(0) has been modified by checking to see if a dirty bit (not shown) associated with the CI cache entry 158(0) has been set. If the current CI cache entry 158(0) has been modified, the CMC 36 writes the current CI cache entry 158(0) to the corresponding one of the master directory memory blocks 94(0)-94(Y), as indicated by arrow 188, before writing the master directory memory block 94(0) into the CI cache 70 as the new CI cache entry 158(0).

In some aspects, the master directory 66 may be updated in response to a cache miss in the CI cache 70 for only a certain percentage of memory write requests 114 received by the CMC 36. Accordingly, in such aspects, the CMC 36 may probabilistically determine (e.g., based on a random number generator (not shown)) whether to update the stored CI 96(0) for the memory block 82(0) in the master directory 66. If not, the operations described above with respect to a cache miss are omitted (i.e., neither the master directory 66 nor the CI cache 70 are updated, and the generated CI 120 is stored in the ECC bits 86(0)-86(Z) of one or more of the memory blocks 82(0)-82(Z)).

Figure 10A:
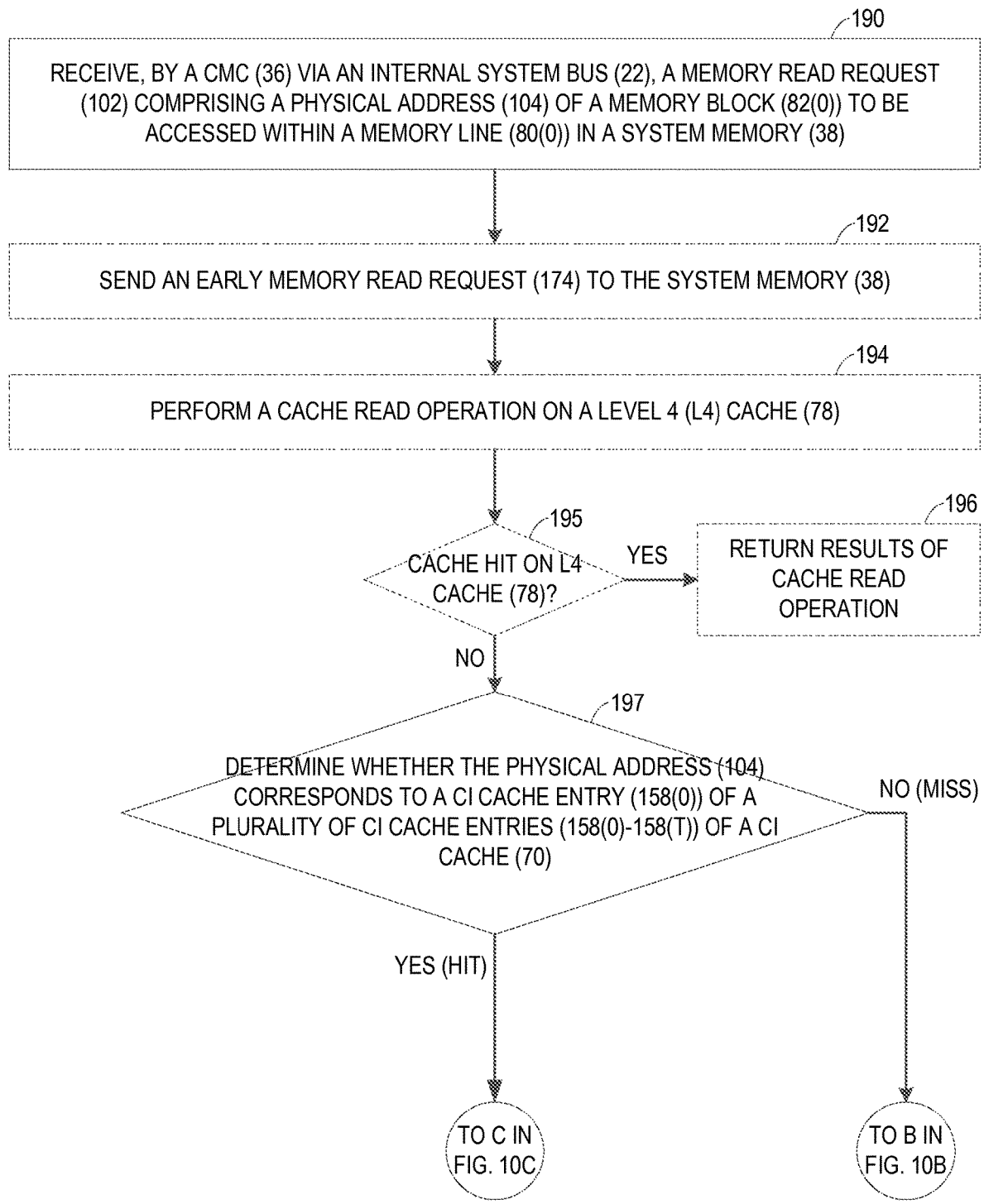
FIGS. 10A-10C are flowcharts illustrating exemplary operations for performing a memory read operation by the CMC of FIG. 9A using the CI cache.
Figure 10B:
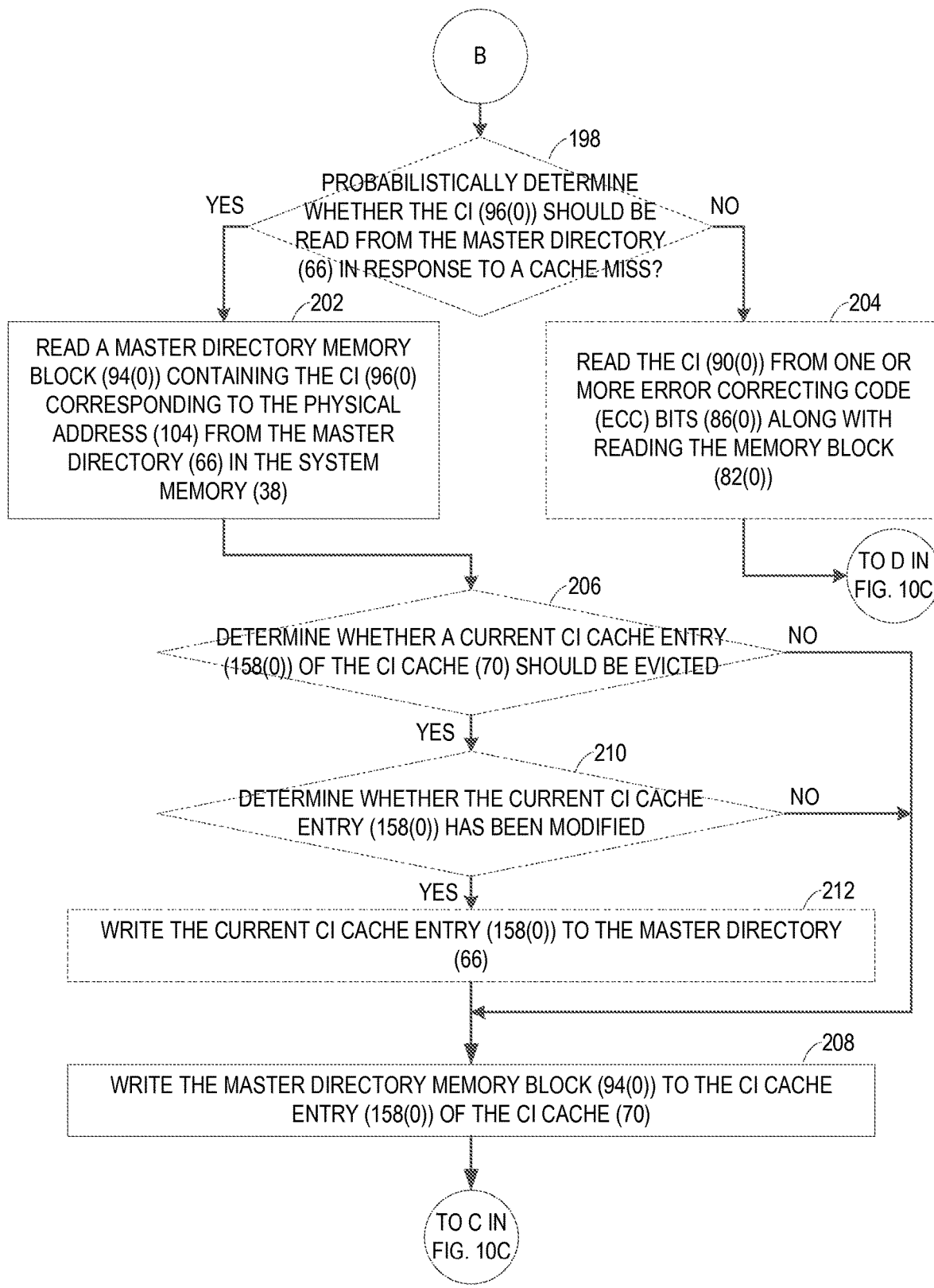
Figure 10C:
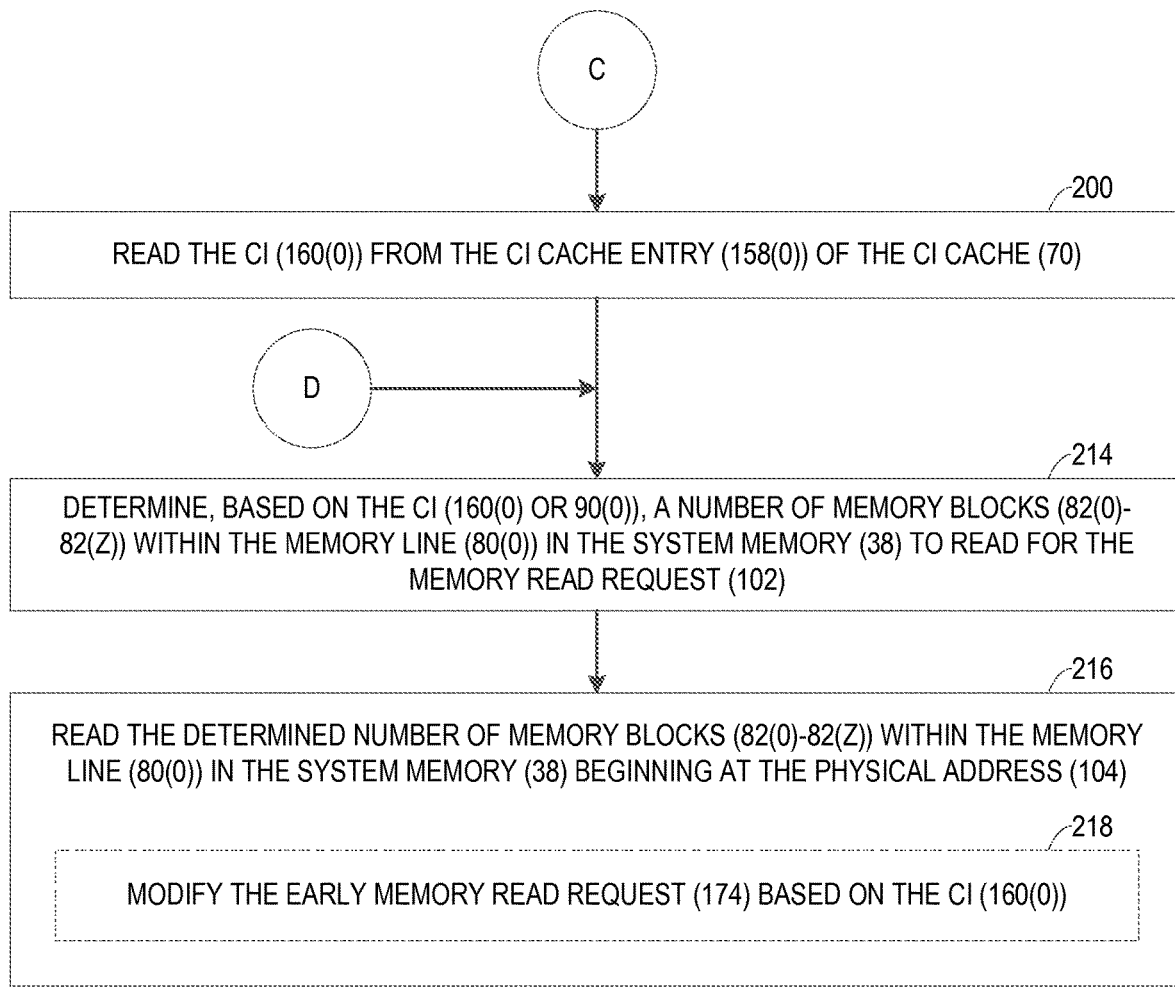

FIGS. 10A-10C are flowcharts illustrating exemplary operations for performing a memory read operation by the CMC 36 of FIG. 3 using the CI cache 70 of FIGS. 9A and 9B. In particular, FIG. 10A illustrates operations for receiving the memory read request 102 and determining whether a search of the CI cache 70 for a CI 160(0) corresponding to the physical address 104 of the memory read request 102 results in a hit or a miss. FIG. 10B illustrates operations carried out as a result of a cache miss on the CI cache 70, while FIG. 10C illustrates operations carried out as a result of a cache hit on the CI cache 70. Elements of FIGS. 2, 3, and 9A are referenced in describing FIGS. 10A-10C for the sake of clarity.

Operations in FIG. 10A begin with the CMC 36 receiving, via the internal system bus 22, the memory read request 102 comprising the physical address 104 of a memory block 82(0) to be accessed within the memory line 80(0) in the system memory 38 (block 190). In some aspects, the CMC 36 may send the early memory read request 174 to the system memory 38 concurrently with subsequent operations (block 192). The CMC 36, according to some aspects, may perform a cache read operation on an L4 cache, such as the L4 cache 78 of FIG. 5, concurrently with subsequent operations (block 194). A determination is then made regarding whether the cache read operation on the L4 cache 78 resulted in a cache hit (block 195). If so, then the results of the cache read operation are returned, and the read to the system memory 38 is rendered moot (block 196).

The CMC 36 next determines whether the physical address 104 corresponds to a CI cache entry 158(0) of a plurality of CI cache entries 158(0)-158(T) of a CI cache 70 (block 197). If the CMC 36 determines at decision block 196 that the physical address 104 does not correspond to a CI cache entry 158(0) of the plurality of CI cache entries 158(0)-158(T) (i.e., a cache miss), processing resumes at block 198 of FIG. 10B. If the physical address 104 is determined to correspond to a CI cache entry 158(0) (i.e., a cache hit), processing resumes at block 200 of FIG. 10C.

Referring now to FIG. 10B, the CMC 36 in some aspects may probabilistically determine whether the CI 96(0) should be read from the master directory 66 in response to a cache miss (block 198). Note that in such aspects, the ECC bits 86(0)-86(Z), 88(0)-88(Z) of the one or more of the memory blocks 82(0)-82(Z), 84(0)-84(Z) will store the CIs 90(0)-90(Z), 92(0)-92(Z). The probabilistic determination may be made using a random number generator, as a non-limiting example. If it is determined at decision block 198 that the CI 96(0) should be read from the master directory 66, the CMC 36 reads the master directory memory block 94(0) containing the CI 96(0) corresponding to the physical address 104 from the master directory 66 in the system memory 38 (block 202). If the CMC 36 determines at decision block 198 that the CI 96(0) should not be read from the master directory 66, the CMC 36 reads the CI 90(0) from one or more ECC bits 86(0) along with reading the memory block 82(0) (block 204). Processing then resumes at block 214 of FIG. 10C.

With continuing reference to FIG. 10B, the CMC 36 according to some aspects may next determine whether a current CI cache entry 158(0) of the CI cache 70 should be evicted (block 206). If not, processing resumes at block 208 of FIG. 10B. If the CMC 36 determines at decision block 206 that the current CI cache entry 158(0) should be evicted, the CMC 36 next determines whether the current CI cache entry 158(0) has been modified (block 210). This determination may be based on determining whether a dirty bit for the CI cache entry 158(0) has been set, as a non-limiting example. If the current CI cache entry 158(0) is determined at decision block 210 to be unchanged, processing resumes at block 208 of FIG. 10B. Otherwise, the CMC 36 writes the current CI cache entry 158(0) to the master directory 66 (block 212). The master directory memory block 94(0) is then written to the CI cache entry 158(0) of the CI cache 70 (block 208). Processing then resumes at block 200 of FIG. 10C.

Turning now to FIG. 10C, the CMC 36 reads the CI 160(0) from the CI cache entry 158(0) of the CI cache 70 (block 200). The CMC 36 next determines, based on the CI 160(0), a number of memory blocks 82(0)-82(Z) within the memory line 80(0) in the system memory 38 to read for the memory read request 102 (block 214). The CMC 36 then reads the determined number of memory blocks 82(0)-82(Z) within the memory line 80(0) in the system memory 38 beginning at the physical address 104 (block 216). In aspects in which the early memory read request 174 was issued, the operations of block 216 for reading the determined number of memory blocks 82(0)-82(Z) may include modifying the early memory read request 174 based on the CI 160(0) (block 218).

Figure 11A:
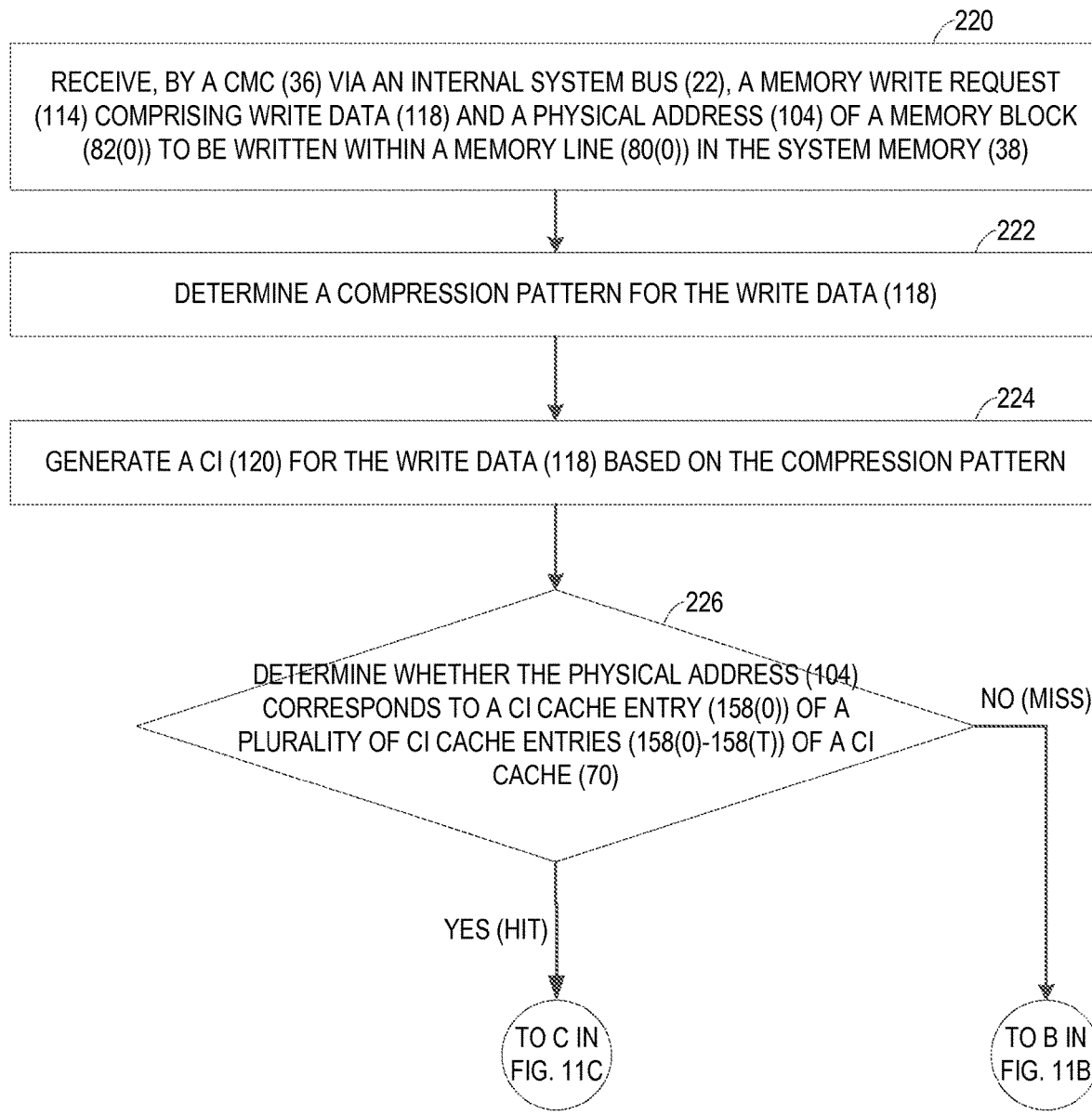
FIGS. 11A-11C are flowcharts illustrating exemplary operations for performing a memory write operation by the CMC of FIG. 9B using the CI cache.
Figure 11B:
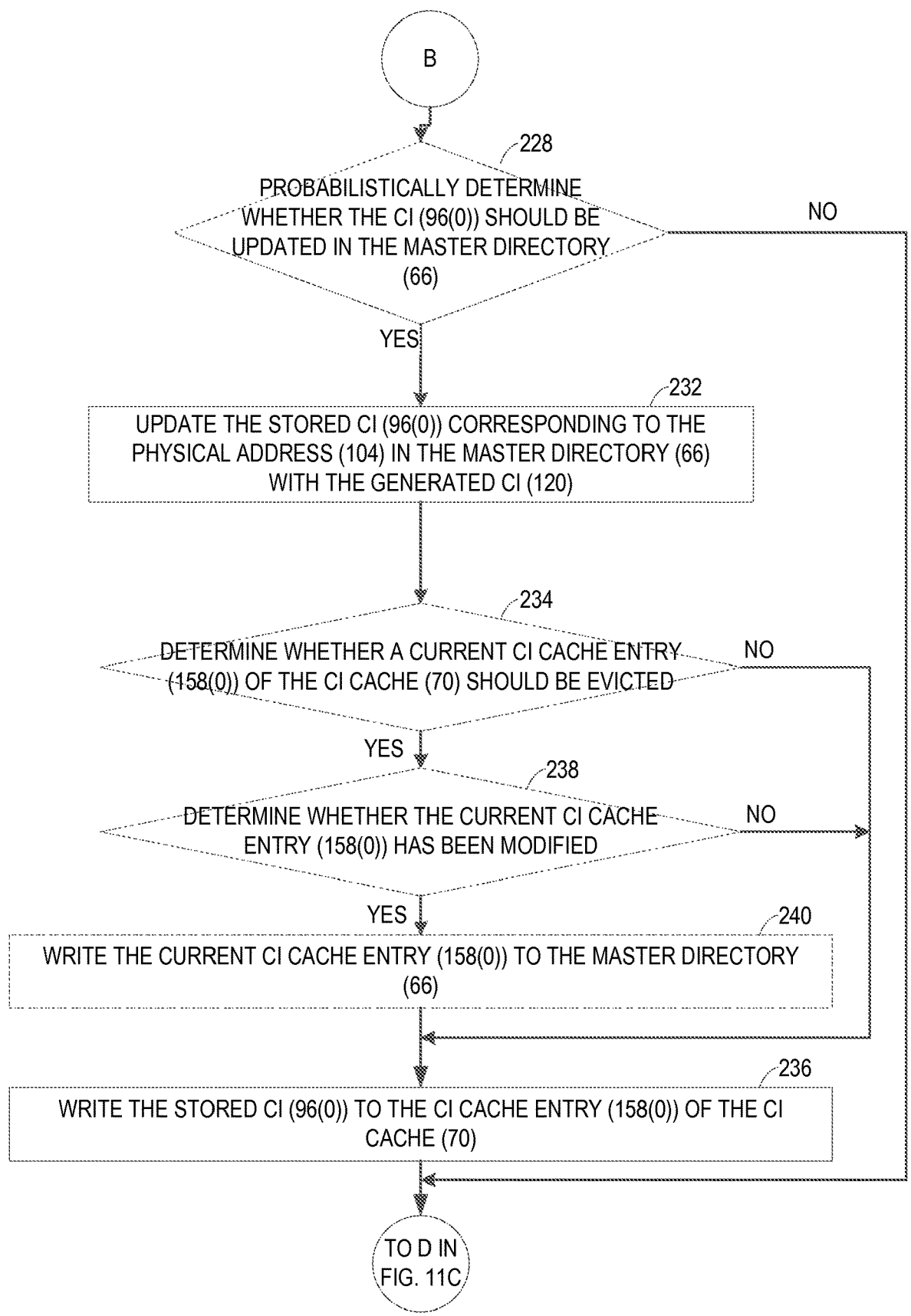
Figure 11C:
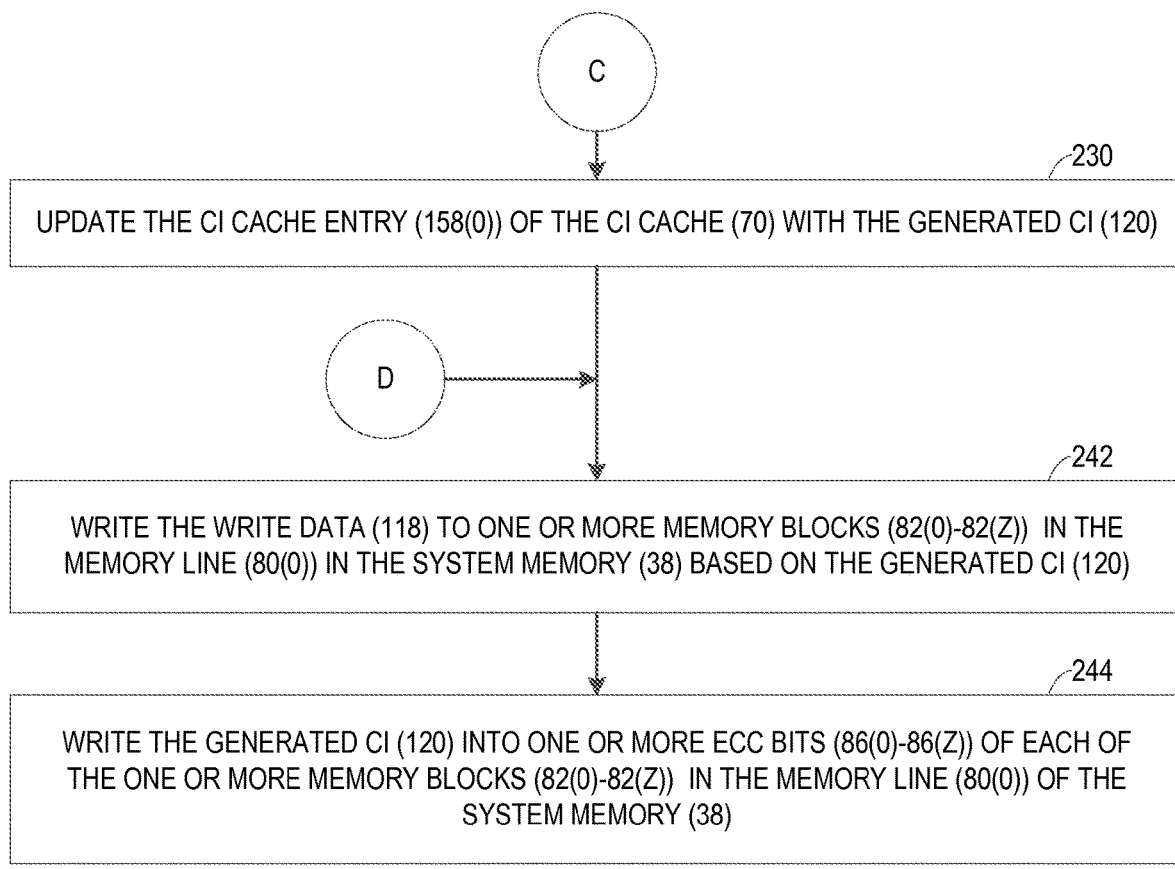

To illustrate exemplary operations for performing a memory write operation by the CMC 36 of FIG. 3 using the CI cache 70 of FIG. 8, FIGS. 11A-11C are provided. FIG. 11A illustrates operations for receiving the memory write request 114 and determining whether a search of the CI cache 70 for a CI cache entry 158(0)-158(T) corresponding to the physical address 104 of the memory write request 114 results in a hit or a miss. FIG. 11B illustrates operations carried out as a result of a cache miss on the CI cache 70, while FIG. 11C illustrates operations carried out as a result of a cache hit on the CI cache 70. Elements of FIGS. 2, 3, and 9B are referenced in describing FIGS. 11A-11C for the sake of clarity.

In FIG. 11A, operations begin with the CMC 36, via the internal system bus 22, a memory write request 114 comprising write data 118 and the physical address 104 of the memory block 82(0) to be written within the memory line 80(0) in the system memory 38 (block 220). The CMC 36 determines a compression pattern for the write data 118 (block 222). In some aspects, the compression pattern may indicate whether the write data 118 is compressed or uncompressed, and/or a number of memory blocks 82(0)-82(Z) occupied by the write data 118. Based on the compression pattern, the CMC 36 generates a CI 120 for the write data 118 based on the compression pattern (block 224).

The CMC 36 next determines whether the physical address 104 corresponds to a CI cache entry 158(0) of a plurality of CI cache entries 158(0)-158(T) of a CI cache 70 (block 226). If the physical address 104 is determined at decision block 226 not to correspond to a CI cache entry 158(0) of the plurality of CI cache entries 158(0)-158(T) (i.e., a cache miss), processing resumes at block 228 of FIG. 11B. However, if the CMC 36 determines at decision block 226 that the physical address 104 corresponds to a CI cache entry 158(0) (i.e., a cache hit), processing resumes at block 230 of FIG. 11C.

Referring now to FIG. 11B, some aspects of the CMC 36 may probabilistically determine whether the CI 96(0) should be updated in the master directory 66 (block 228). If it is determined at decision block 228 that the CI 96(0) should not be updated, processing resumes at block 242 of FIG. 11C. However, if the CMC 36 determines at decision block 228 to update the CI 96(0), or if the CMC 36 is not configured to use probabilistic determination, the CMC 36 updates the stored CI 96(0) corresponding to the physical address 104 in the master directory 66 with the generated CI 120 (block 232).

In some aspects, the CMC 36 may next determine whether a current CI cache entry 158(0) of the CI cache 70 should be evicted (block 234). If not, processing resumes at block 236 of FIG. 11B. If the CMC 36 determines at decision block 234 that the current CI cache entry 158(0) should be evicted, the CMC 36 determines whether the current CI cache entry 158(0) has been modified (block 238). Determining whether the CI cache entry 158(0) has been modified may comprise determining whether a dirty bit of the CI cache entry 158(0) has been set, as a non-limiting example. If the current CI cache entry 158(0) is determined at decision block 238 to be unchanged, processing resumes at block 236 of FIG. 11B. However, if the CMC 36 determines at decision block 238 that the current CI cache entry 158(0) has been modified, the CMC 36 writes the current CI cache entry 158(0) to the master directory 66 (block 240). The CMC 36 then writes the stored CI 96(0) to the CI cache entry 158(0) of the CI cache 70 (block 236). Processing resumes at block 242 of FIG. 11C.

In FIG. 11C, the CMC 36 updates the CI cache entry 158(0) of the CI cache 70 with the generated CI 120 (block 230). The CMC 36 then writes the write data 118 to one or more memory blocks 82(0)-82(Z) in the memory line 80(0) in the system memory 38 based on the generated CI 120 (block 242). The generated CI 120 is written into one or more ECC bits 86(0)-86(Z) of each of the one or more memory blocks 82(0)-82(Z) in the memory line 80(0) of the system memory 38 (block 244). In some aspects, the generated CI 120 is written into the ECC bits 86(0) as part of the same memory write operation that writes the write data 118 to the first memory block 82(0).

As discussed above, it may be desired to provide compression of a memory data block 82(0)-82(Z) having a configurable fixed data pattern as a special case to optimize compression. For example, if a memory data block 82(0)-82(Z) (e.g., 128 bytes) is all 0's, then data is not read or written, but noted in a separate data structure as all 0's. A zero-bit could be provided in the system memory 38 to denote if a memory line 80(0)-80(X) is compressed, thus adding one (1) bit per memory data block 82(0)-82(Z). The CMC 36 could maintain a cache that remembers, for a number of 128-byte memory blocks 82(0)-82(Z) for example, if a block is all 0's. For a write operation, if a line of a memory data block 82(0)-82(Z) is all 0's, the CMC 36 does not write the line to the system memory 38, but the CI cache 70 is updated. For a read operation, the zero-bit in the CI cache 70 is checked for the line. If the line is in the CI cache 70, then depending on the zero-bit, either the line is read from the system memory 38, or all 0's is returned. If the line is not in the CI cache 70, then it is read from the system memory 38. If the line is zero, then the CI cache 70 can be updated.

The CI cache 70 can be updated to evict a cache line 74 according to known techniques (LRU, pseudo-LRU, etc.). If a line is evicted, all lines that have their zero-bit set need to be written to main memory. This can be organized as a write-all-zeros queue. A possible optimization would be to use two (2) bits, wherein one bit denotes if the line is all-zeros, and another bit denotes if the line is dirty (i.e., has not been written to main memory yet). A background task of the CMC 36 can inspect the CI cache 70 and queue the lines with dirty-bits in a "write-all-zeros" queue. With the memory bandwidth compression mechanisms described above, different memory compression mechanisms can be employed by the CMC 36 as desired. For example, it may be desired to employ memory compression mechanisms that are optimized for small data blocks, such as 64, 128, and 256 bytes, since the cache lines 74 described in the examples above include these sizes as examples.

In some aspects, a value of a CI comprising multiple bits may indicate a compression status and/or a fixed data pattern stored in a memory block such as one of the memory blocks 82(0)-82(Z). As a non-limiting example, for a CI of two (2) bits, a value of "00" may indicate that the corresponding memory block is uncompressed, while a value of "01" may indicate that the corresponding memory block is compressed. A value of "11" may indicate that a fixed pattern (e.g., all zeroes (0s) or all ones (1s)) is stored in the corresponding memory block. In such aspects, the master directory 66 would always be updated rather than being updated subject to a probabilistic determination.

Figure 12:
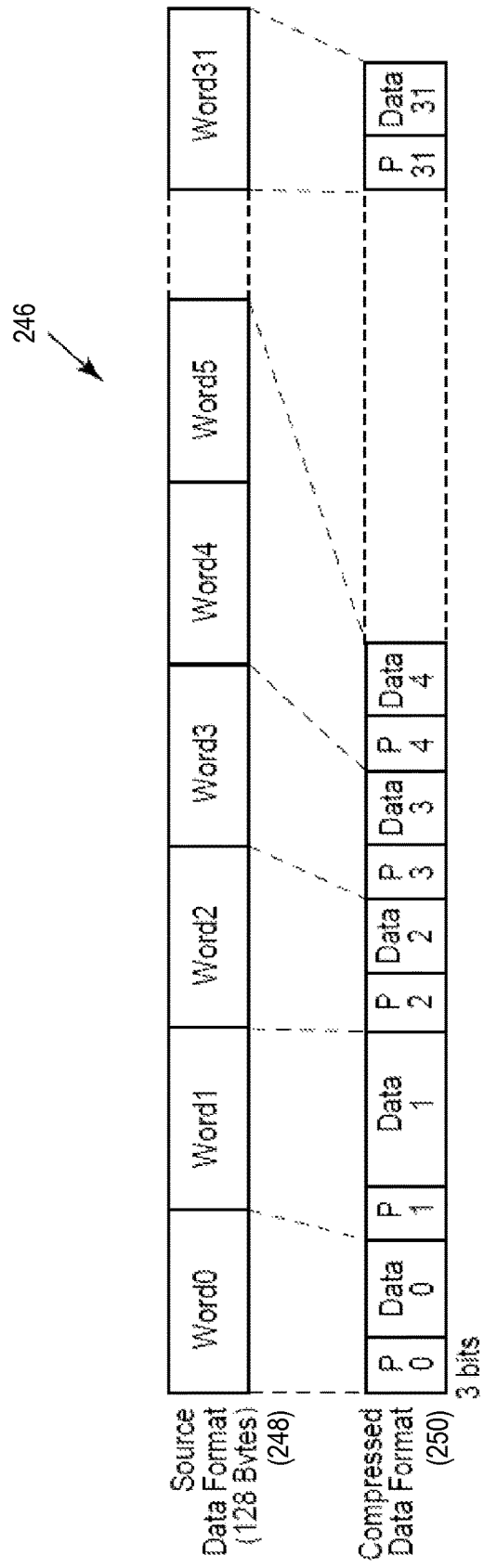

In this regard, FIG. 12 illustrates a frequent pattern compression data compression mechanism 246. In this regard, the source data in a source data format 248 to be compressed is shown by example as 128 bytes. A compressed data format 250 is shown below. The compressed data format 250 is provided in a format of prefix codes Px and data behind the prefix as Datax. The prefix is 3-bits. The prefix codes are shown in a prefix code column 252 in a frequent pattern encoding table 254 that shows the pattern encoded in a pattern encoded column 256 for a given prefix code in the prefix code column 252. The data size for the pattern encoded is provided in a data size column 258 of the frequent pattern encoding table 254.

Figure 13:
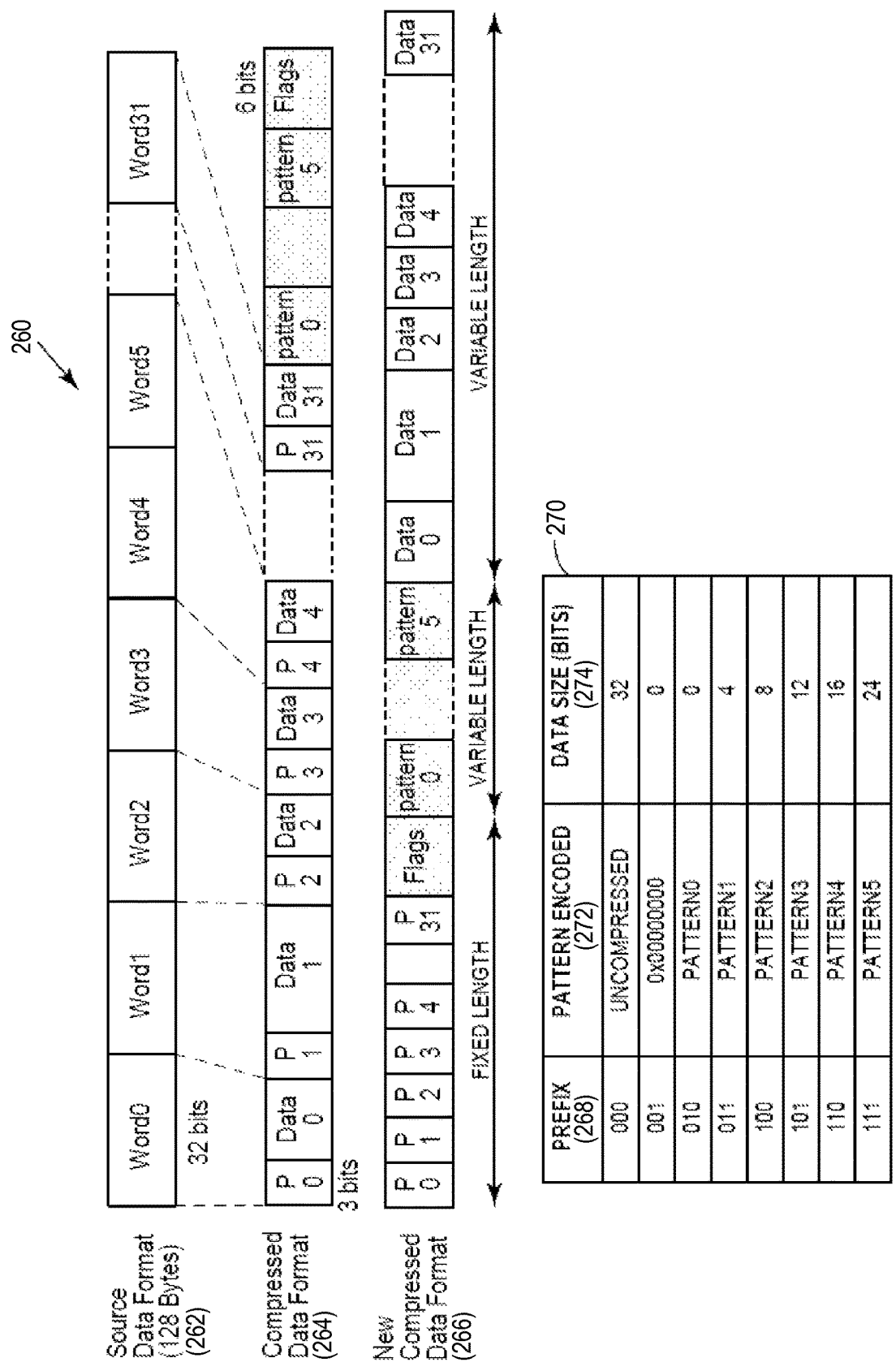

FIG. 13 illustrates a 32-bit frequent pattern compression data compression mechanism 260. In this regard, the source data in a source data format 262 to be compressed is shown by example as 128 bytes. A compressed data format 264 is shown below. The compressed data format 264 is provided in a format of prefix Px and data immediately behind the prefix as Datax. A new compressed data format 266 is provided in a different format of prefix codes Px, data Datax, flags, and patterns, which are organized to be grouped together for efficiency purposes. The prefix code is 3-bits. The prefix codes are shown in a prefix code column 268 in a frequency pattern encoding table 270 that shows the pattern encoded in a pattern encoded column 272 for a given prefix code in the prefix code column 268. The data size for the pattern encoded is provided in a data size column 274 of the frequency pattern encoding table 270. The prefix code 000 signifies an uncompressed pattern, which would be data of the full size of 32-bits in the new compressed data format 266. The prefix code 001 signifies an all zero data block, which can be provided as 0 bits in the data of the new compressed data format 266. With a 3-bit prefix, prefix codes 010-111 can be used to encode other specific patterns that are recognized in the source data, which in this example are patterns in 0, 4, 8, 12, 16, and 24 bits respectively.

Figure 14:
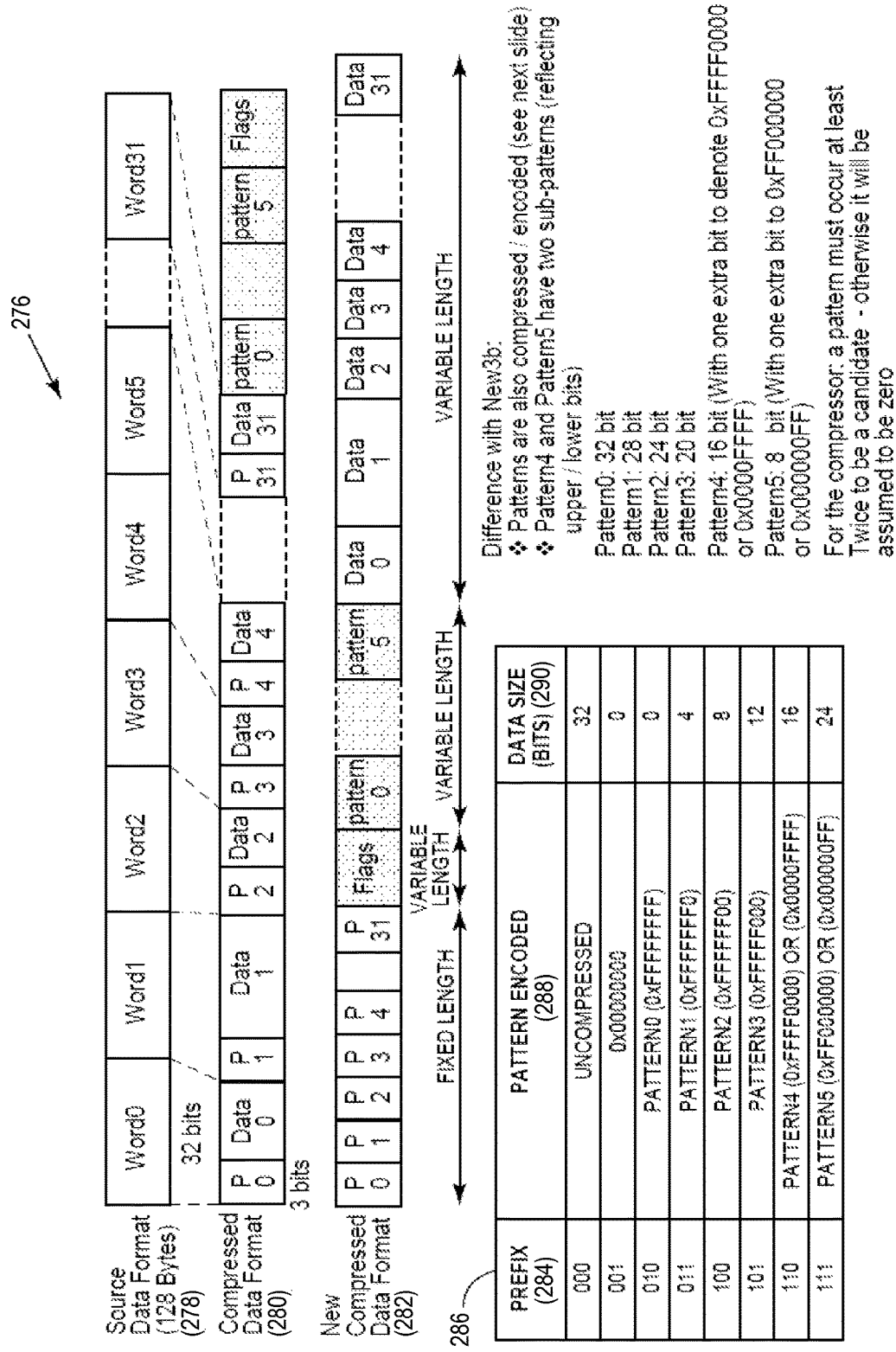

FIG. 14 illustrates an example of 32-bit frequent pattern compression data compression mechanism 276. In this regard, the source data in a source data format 278 to be compressed is shown by example as 128 bytes. A compressed data format 280 is shown below. The compressed data format 280 is provided in a format of prefix Px and data behind the prefix as Datax. A new compressed data format 282 is provided in a different format of prefix codes Px, data Datax, flags, and patterns, which are organized to be grouped together for efficiency purposes. The prefix code is 3-bits. The prefix codes are shown in a prefix code column 284 in a frequency pattern encoding table 286 that shows the pattern encoded in a pattern encoded column 288 for a given prefix code in the prefix code column 284. The data size for the pattern encoded is provided in a data size column 290 of the frequency pattern encoding table 286. The prefix code 000 signifies an uncompressed pattern, which would be data of the full size of 32-bits in the new compressed data format 282. The prefix code 001 signifies an all zero data block, which can be provided as 0 bits in the data of the new compressed data format 282. Prefix code 010 signifies pattern 0xFFFFFFFF, which is a specific pattern and thus requires 0-bit data size in the compressed data according to the new compressed data format 282. Other patterns are shown in the frequency pattern encoding table 286 for prefix codes 011-111. The flags field in the new compressed data format 282 indicates which patterns for prefix codes 001-111 are present in the data portions (i.e., Datax) of the compressed data. If the pattern is present in the compressed data, the patterns are stored in the new compressed data format 282 that can then be consulted to recreate the uncompressed data. The data fields include the compressed data according to the prefix code associated with the data field in the new compressed data format 282.

Figure 15:

FIG. 15 illustrates another example of 64-bit frequent pattern compression data compression mechanism 292. In this regard, the source data in a source data format 294 to be compressed is shown by example as 128 bytes. A new compressed data format 296 is provided in a different format of prefix codes Px, data Datax, flags, and patterns, which are organized to be grouped together for efficiency purposes. The prefix code is 4-bits. The prefix codes are shown in prefix code columns 298, 300 in a frequency pattern encoding table 302 that shows the pattern encoded in pattern encoded columns 304, 306 for a given prefix code in the prefix code columns 298, 300. The data size for the pattern encoded is provided in data size columns 308, 310 of the frequency pattern encoding table 302. The prefix code 0000 signifies an all zero data block, which can be provided as 0 bits in the data of the new compressed data format 296. Other patterns are shown in the frequency pattern encoding table 302 for prefix codes 0001-1111, which include ASCII patterns for frequently occurring ASCII patterns. The flags field in the new compressed data format 296 indicates which patterns for prefix codes 0001-1111 are present in the data portions (i.e., Datax) compressed data. If the pattern is present in the compressed data, the patterns are stored in the new compressed data format 296 that can then be consulted to recreate the uncompressed data. The data fields include the compressed data according to the prefix code associated with the data field in the new compressed data format 296.

Figure 16:
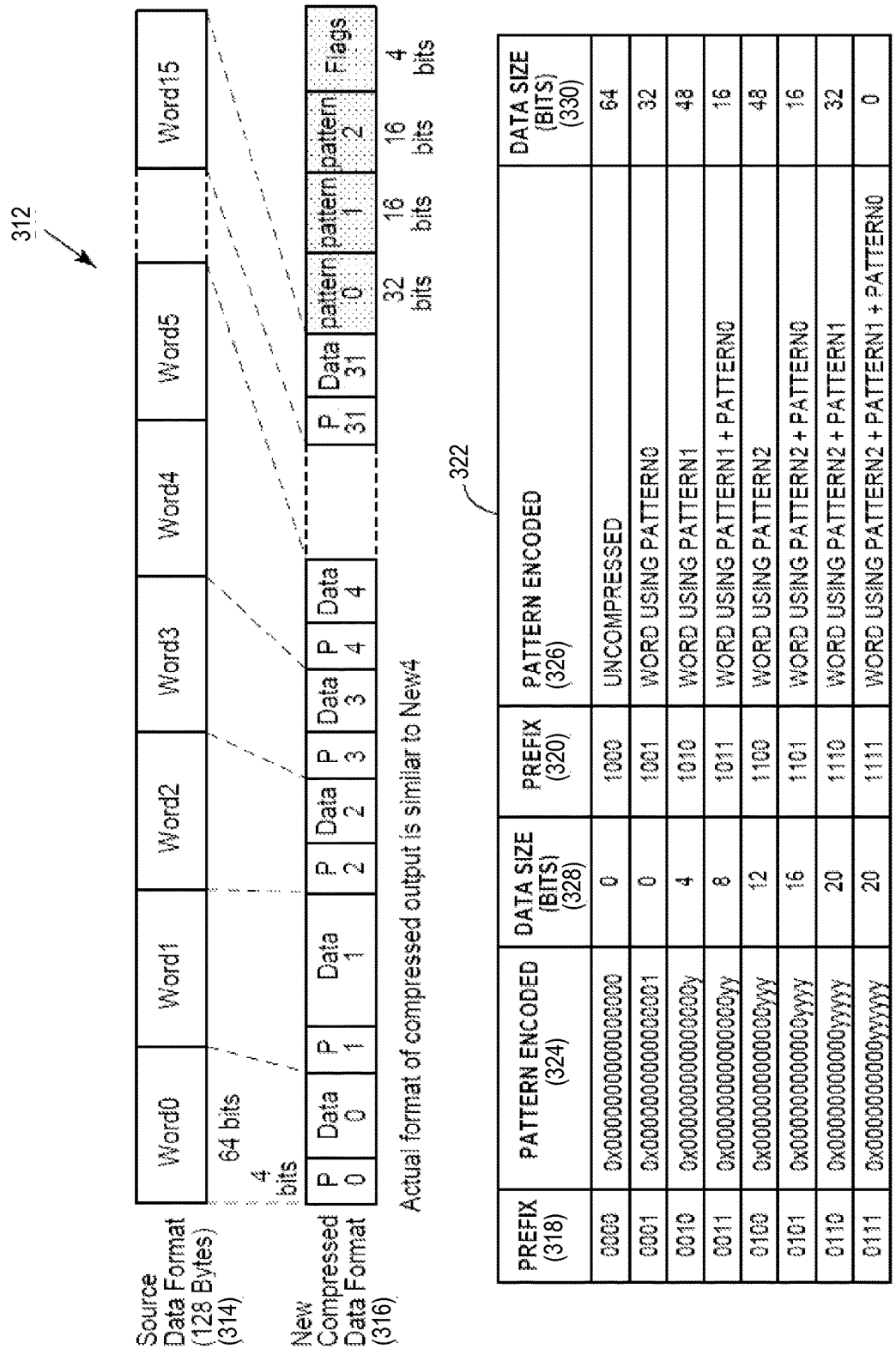

FIG. 16 illustrates another example of 64-bit frequent pattern compression data compression mechanism 312. In this regard, the source data in a source data format 314 to be compressed is shown by example as 128 bytes. A new compressed data format 316 is provided in a different format of prefix codes Px, data Datax, flags, and patterns, which are organized to be grouped together for efficiency purposes. The prefix code is 4-bits. The prefix codes are shown in prefix code columns 318, 320 in a frequency pattern encoding table 322 that shows the pattern encoded in pattern encoded columns 324, 326 for a given prefix code in the prefix code columns 318, 320. The data size for the pattern encoded is provided in data size columns 328, 330 of the frequency pattern encoding table 322. The prefix code 0000 signifies an all zero data block, which can be provided as 0 bits in the data of the new compressed data format 316. Other patterns are shown in the frequency pattern encoding table 322 for prefix codes 0001-1111, which can include combinations of fixed patterns. The flags field in the new compressed data format 316 indicates which patterns for prefix does 0001-1111 are present in the data portions (i.e., Datax) in the compressed data. If the pattern is present in the compressed data, the patterns are stored in the new compressed data format 316, which can then be consulted during data compression to recreate the uncompressed data. The prefix code P0-P31 can link to the patterns, which are used along with the corresponding data (Datax) to recreate the full length data in uncompressed format. The data fields include the compressed data according to the prefix code associated with the data field in the new compressed data format 316.

Examples of fixed patterns that can be used with the frequent pattern compression data compression mechanism 312 in FIG. 16 is shown in table 332 in FIG. 17, where the fixed patterns are provided in a pattern column 334, with its length in a length column 336 and the definition of the pattern in a pattern definition column 338. The flags definitions are shown in a flag definition table 340 to allow the CMC 36 to correlate a given pattern linked to a prefix code to a definition used to create uncompressed data. The flag definition table 340 includes the bits for a given flag in a flags column 342, the value of the bits for a given flag in a flag value column 344, and a flag definition for a given flag in a flag definition column 346.

FIG. 18 illustrates another example of 64-bit frequent pattern compression data compression mechanism 348. In this regard, the source data in a source data format 350 to be compressed is shown by example as 128 bytes. A new compressed data format 352 is provided in a different format of prefix codes Px, data Datax, flags, and patterns, which are organized to be grouped together for efficiency purposes. The prefix code is 4-bits. The prefix codes are shown in prefix code columns 354, 356 in a frequency pattern encoding table 358 that shows the pattern encoded in pattern encoded columns 360, 362 for a given prefix code in the prefix code columns 354, 356. The data size for the pattern encoded is provided in data size columns 364, 366 of the frequency pattern encoding table 358. The prefix code 0000 signifies an all zero data block, which can be provided as 0 bits in the data of the new compressed data format 352. The prefix code 1111 signifies a data block that is not compressed in the new compressed data format 352. Other patterns are shown in the frequency pattern encoding table 358 for prefix codes 0001-1110, which can include combinations of defined patterns as shown therein. The flags field in the new compressed data format 352 indicates which patterns for prefix codes 0000-1110 are present in the data portions (i.e., Datax) of the compressed data. If the pattern is present in the compressed data, the patterns are stored in the new compressed data format 352 that can then be consulted to recreate the uncompressed data. The new compressed data format 352 is shown as only containing patterns 0-5, because these were the only patterns accounted for in the prefix codes 0000-1110 present in the source data in this example. The data fields include the compressed data according to the prefix code associated with the data field in the new compressed data format 352.

Providing memory bandwidth compression using CMCs in a CPU-based system according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 19:
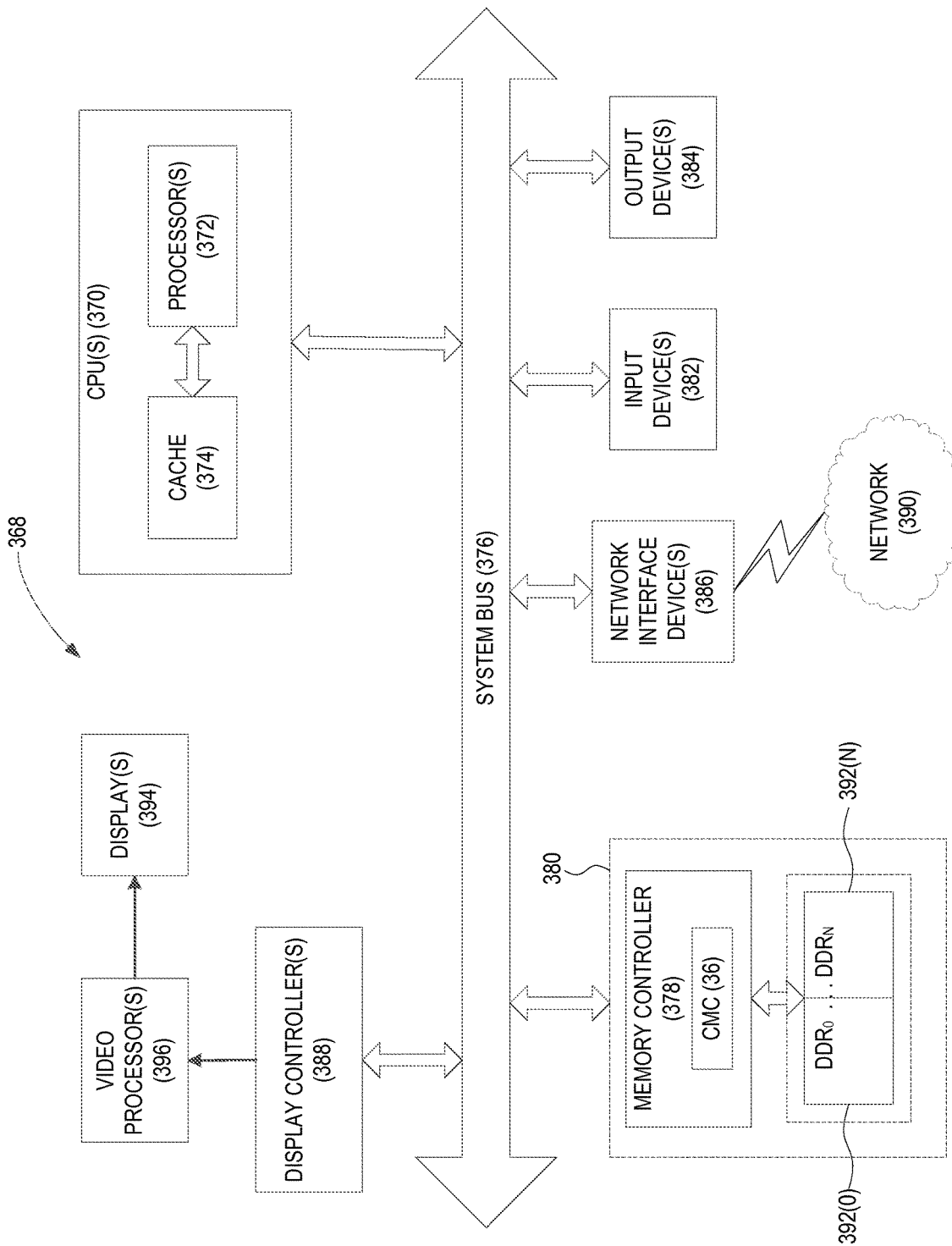
FIG. 19 is a block diagram of an exemplary computing device that may include the SoC of FIG. 1 that employs the CMC of FIG. 2.

In this regard, FIG. 19 illustrates an example of a processor-based system 368 that can employ the SoC 10' of FIG. 2 with the CMC 36 of FIG. 2. In this example, the processor-based system 368 includes one or more CPUs 370, each including one or more processors 372. The CPU(s) 370 may have cache memory 374 coupled to the processor(s) 372 for rapid access to temporarily stored data. The CPU(s) 370 is coupled to a system bus 376 and can intercouple devices included in the processor-based system 368. As is well known, the CPU(s) 370 communicates with these other devices by exchanging address, control, and data information over the system bus 376. For example, the CPU(s) 370 can communicate bus transaction requests to a memory controller 378 as an example of a slave device. Although not illustrated in FIG. 19, multiple system buses 376 could be provided.

Other devices can be connected to the system bus 376. As illustrated in FIG. 19, these devices can include a memory system 380, one or more input devices 382, one or more output devices 384, one or more network interface devices 386, and one or more display controllers 388, as examples. The input device(s) 382 can include any type of input device, including but not limited to input keys, switches, voice processors, etc. The output device(s) 384 can include any type of output device, including but not limited to audio, video, other visual indicators, etc. The network interface device(s) 386 can be any devices configured to allow exchange of data to and from a network 390. The network 390 can be any type of network, including but not limited to a wired or wireless network, a private or public network, a local area network (LAN), a wide local area network, wireless local area network, BLUETOOTH (BT), and the Internet. The network interface device(s) 386 can be configured to support any type of communications protocol desired. The memory system 380 can include one or more memory units 392(0)-392(N).

The CPU(s) 370 may also be configured to access the display controller(s) 388 over the system bus 376 to control information sent to one or more displays 394. The display controller(s) 388 sends information to the display(s) 394 to be displayed via one or more video processors 396, which process the information to be displayed into a format suitable for the display(s) 394. The display(s) 394 can include any type of display, including but not limited to a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A compressed memory controller, comprising a memory interface configured to access a system memory via a system bus;
   the compressed memory controller configured to:
      receive a memory read request comprising a physical address of a memory block to be accessed within a memory line in the system memory;
      read a master directory memory block containing a compression indicator (CI) corresponding to the physical address from a master directory in the system memory;
      determine, as indicated by the CI, a number of memory blocks within the memory line in the system memory to read for the memory read request;
      probabilistically determining whether the CI should be read from the master directory; and
      responsive to probabilistically determining that the CI should be read from the master directory, read the determined number of memory blocks within the memory line in the system memory beginning at the physical address.

2. The compressed memory controller of claim 1, wherein the compressed memory controller is further configured to, responsive to probabilistically determining that the CI should not be read from the master directory, read the CI from one or more error correcting code (ECC) bits associated with the determined number of memory blocks.

3. The compressed memory controller of claim 1, further comprising a CI cache comprising a plurality of CI cache entries each configured to store a previously read master directory memory block;
   the compressed memory controller further configured to, prior to reading the master directory memory block, determine whether the physical address corresponds to a CI cache entry of the plurality of CI cache entries of the CI cache;
   the compressed memory controller configured to read the master directory memory block responsive to determining that the physical address does not correspond to a CI cache entry of the plurality of CI cache entries of the CI cache; and
   the compressed memory controller further configured to:
      responsive to determining that the physical address does not correspond to a CI cache entry of the plurality CI cache entries of the CI cache:
         write the master directory memory block to a CI cache entry of the CI cache; and
         read the CI from the CI cache entry of the CI cache; and
      responsive to determining that the physical address corresponds to the CI cache entry of the plurality CI cache entries of the CI cache, read the CI from the CI cache entry of the CI cache.

4. The compressed memory controller of claim 3, further configured to, prior to writing the master directory memory block to the CI cache entry of the CI cache:
   determine whether a current CI cache entry of the CI cache should be evicted; and
   responsive to determining that the current CI cache entry should be evicted:
      determine whether the current CI cache entry has been modified; and responsive to determining that the current CI cache entry has been modified, write the current CI cache entry to the master directory.

5. The compressed memory controller of claim 3, further configured to send an early memory read request to the system memory in parallel with determining whether the physical address corresponds to a CI cache entry of the plurality of CI cache entries of the CI cache;
the compressed memory controller configured to read the determined number of memory blocks by being configured to, responsive to determining that the physical address corresponds to the CI cache entry of the plurality CI cache entries of the CI cache, modify the early memory read request based on the CI.

6. The compressed memory controller of claim 3, further configured to perform a cache read operation on a Level 4 (L4) cache in parallel with determining whether the physical address corresponds to a CI cache entry of the plurality of CI cache entries of the CI cache.

7. The compressed memory controller of claim 1, configured to determine, as indicated by the CI, the number of memory blocks within the memory line in the system memory to read for the memory read request by being configured to determine a compression pattern indicated by the CI.

8. The compressed memory controller of claim 7, configured to determine the compression pattern indicated by the CI by being configured to determine that the CI comprises a zero-line indicator indicating that zero memory blocks should be read.

9. A method for providing memory bandwidth compression for memory read requests, comprising:
receiving, by a compressed memory controller via a system bus, a memory read request comprising a physical address of a memory block to be accessed within a memory line in a system memory;
reading a master directory memory block containing a compression indicator (CI) corresponding to the physical address from a master directory in the system memory;
determining, as indicated by the CI, a number of memory blocks within the memory line in the system memory to read for the memory read request;
probabilistically determining that the CI should be read from the master directory; and
responsive to probabilistically determining that the CI should be read from the master directory, reading the determined number of memory blocks within the memory line in the system memory beginning at the physical address.

10. The method of claim 9,
further comprising:
receiving, by the compressed memory controller via the system bus, a second memory read request comprising a second physical address of a memory block to be accessed within a second memory line in the system memory;
reading a second master directory memory block containing a second CI corresponding to the second physical address from the master directory in the system memory;
determining, as indicated by the second CI, a second number of memory blocks within the second memory line in the system memory to read for the second memory read request;
probabilistically determining that the second CI should be not be read from the master directory; and
responsive to probabilistically determining that the second CI should not be read from the master directory, reading the second CI from one or more error correcting code (ECC) bits associated with the determined second number of memory blocks.

11. The method of claim 9, further comprising:
prior to reading the master directory memory block, determining whether the physical address corresponds to a CI cache entry of a plurality of CI cache entries of a CI cache;
wherein reading the master directory memory block is responsive to determining that the physical address does not correspond to a CI cache entry of the plurality of CI cache entries of the CI cache; and
the method further comprising:
responsive to determining that the physical address does not correspond to a CI cache entry of the plurality CI cache entries of the CI cache:
writing the master directory memory block to a CI cache entry of the CI cache; and
reading the CI from the CI cache entry of the CI cache; and
responsive to determining that the physical address corresponds to the CI cache entry of the plurality CI cache entries of the CI cache, reading the CI from the CI cache entry of the CI cache.

12. The method of claim 11, further comprising, prior to writing the master directory memory block to the CI cache entry of the CI cache:
determining whether a current CI cache entry of the CI cache should be evicted; and
responsive to determining that the current CI cache entry should be evicted:
determining whether the current CI cache entry has been modified; and
responsive to determining that the current CI cache entry has been modified, writing the current CI cache entry to the master directory.

13. The method of claim 11, further comprising sending an early memory read request to the system memory in parallel with determining whether the physical address corresponds to a CI cache entry of the plurality of CI cache entries of the CI cache;
wherein reading the determined number of memory blocks comprises, responsive to determining that the physical address corresponds to the CI cache entry of the plurality CI cache entries of the CI cache, modifying the early memory read request based on the CI.

14. The method of claim 11, further comprising performing a cache read operation on a Level 4 (L4) cache in parallel with determining whether the physical address corresponds to a CI cache entry of the plurality of CI cache entries of the CI cache.

15. The method of claim 9, wherein determining, as indicated by the CI, the number of memory blocks within the memory line in the system memory to read for the memory read request comprises determining a compression pattern indicated by the CI.

16. The method of claim 15, wherein determining the compression pattern indicated by the CI comprises determining that the CI comprises a zero-line indicator indicating that zero memory blocks should be read.

* * * * *